(12) United States Patent
Liege

(10) Patent No.: US 8,412,725 B2
(45) Date of Patent: Apr. 2, 2013

(54) METHOD FOR PROCESSING AN OBJECT ON A PLATFORM HAVING ONE OR MORE PROCESSORS AND MEMORIES, AND PLATFORM USING SAME

(75) Inventor: Bruno Liege, Boulogne (FR)

(73) Assignee: DXO Labs, Boulogne Billiancourt (FR)

( * ) Notice: Subject to any disclaimer, the term of this patent is extended or adjusted under 35 U.S.C. 154(b) by 1166 days.

(21) Appl. No.: 12/158,129

(22) PCT Filed: Dec. 19, 2006

(86) PCT No.: PCT/FR2006/051390
§ 371 (c)(1),
(2), (4) Date: Aug. 22, 2008

(87) PCT Pub. No.: WO2007/071884
PCT Pub. Date: Jun. 28, 2007

(65) Prior Publication Data
US 2008/0320038 A1    Dec. 25, 2008

(30) Foreign Application Priority Data
Dec. 19, 2005   (FR) ..................... 05 53945

(51) Int. Cl.
*G06F 17/30* (2006.01)
(52) U.S. Cl. ........................................ 707/764
(58) Field of Classification Search .............. 707/103, 707/764
See application file for complete search history.

(56) References Cited

U.S. PATENT DOCUMENTS

| | | | |
|---|---|---|---|
| 4,839,801 A | 6/1989 | Nicely et al. | |
| 4,939,642 A | 7/1990 | Blank | |
| 6,980,980 B1 * | 12/2005 | Yeh ...................... | 1/1 |
| 7,343,040 B2 | 3/2008 | Chanas et al. | |
| 7,346,221 B2 | 3/2008 | Chanas et al. | |
| 7,356,198 B2 | 4/2008 | Chauville et al. | |
| 2003/0151608 A1 | 8/2003 | Chung et al. | |
| 2004/0218071 A1 | 11/2004 | Chauville et al. | |
| 2004/0234152 A1 | 11/2004 | Liege et al. | |
| 2004/0240750 A1 | 12/2004 | Chauville et al. | |
| 2004/0252906 A1 | 12/2004 | Liege et al. | |
| 2005/0002586 A1 | 1/2005 | Liege et al. | |
| 2005/0008242 A1 | 1/2005 | Liege et al. | |

FOREIGN PATENT DOCUMENTS

| | | |
|---|---|---|
| EP | 0 607 988 A1 | 7/1994 |
| WO | WO 99/52040 | 10/1999 |
| WO | WO 2005/064537 A1 | 7/2005 |

OTHER PUBLICATIONS

Michael E. Wolf, et al., "A Data Locality Optimizing Algorithm", Sigplan Notices USA, vol. 26, No. 6, XP 002406665, Jun. 1991, pp. 30-44.
Jean-Francois Nezan, et al., "Fast Prototyping Methodology for Distributed and Heterogeneous Architectures: Application to Mpeg-4 Video Tools", Design Automation for Embedded Systems, vol. 9, No. 2, XP 002406664, Jun. 2004, pp. 141-154.
U.S. Appl. No. 12/097,886, filed Jun. 18, 2008, Liege.
U.S. Appl. No. 12/097,893, filed Jun. 18, 2008, Liege.

* cited by examiner

*Primary Examiner* — Don Wong
*Assistant Examiner* — Deric Ortiz
(74) *Attorney, Agent, or Firm* — Oblon, Spivak, McClelland, Maier & Neustadt, L.L.P.

(57) ABSTRACT

A method for processing, in a platform having one or more processors and memories, an object including elementary information of same type. The method decomposes the object to be processed into at least two sub-objects of N elementary information each, all the sub-objects having the same quantity N of elementary information, the processing performing at least one sequence of specific operations on the elementary information of each sub-object performing, for each sub-object, at least N times each specific operation, such that each elementary information for each sub-object is applied at least one time, and N results are produced for each specific operation, the sequence of specific operations being such that at least one specific operation of the sequence produces, at least once during its N applications, a result used for the processing of another sub-object.

8 Claims, 5 Drawing Sheets

Figure 3:
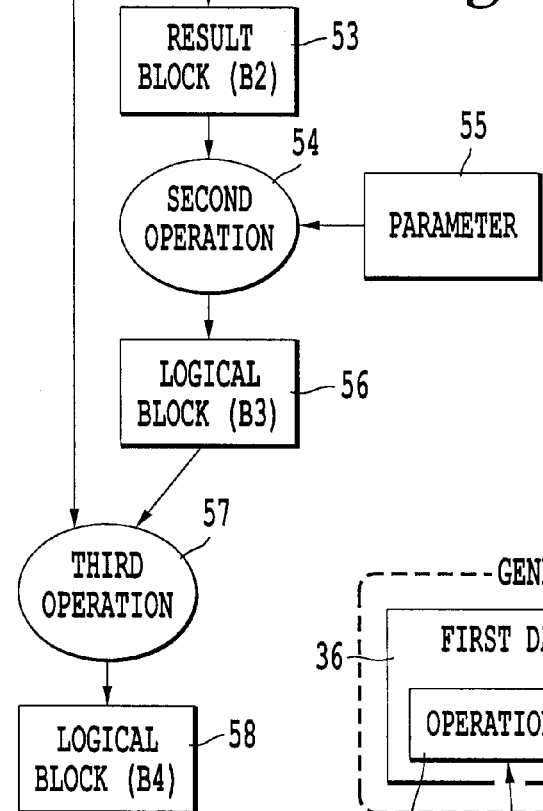

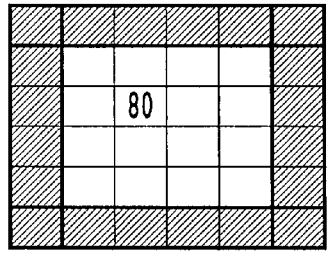
*Fig.1a*  *Fig.1b*  *Fig.1c*  *Fig.1d*
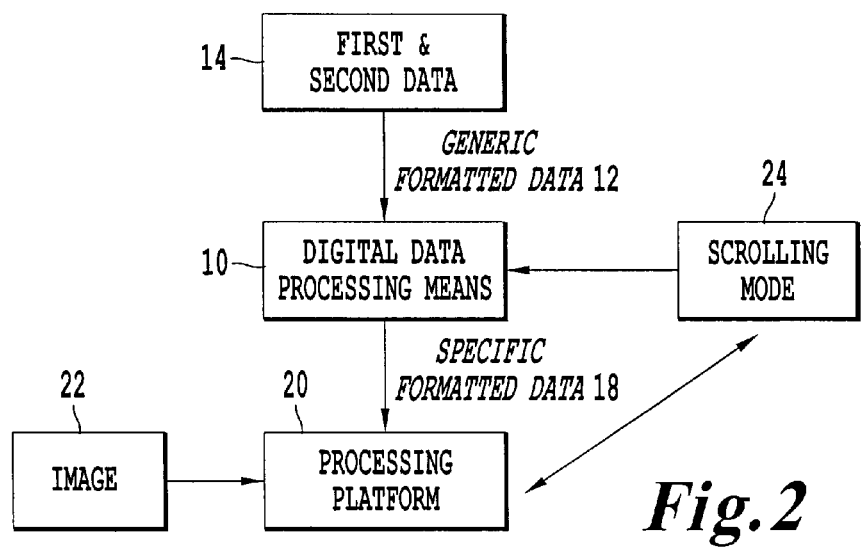
*Fig.1e*
*Fig.1f*
*Fig.2*

Figure 9a
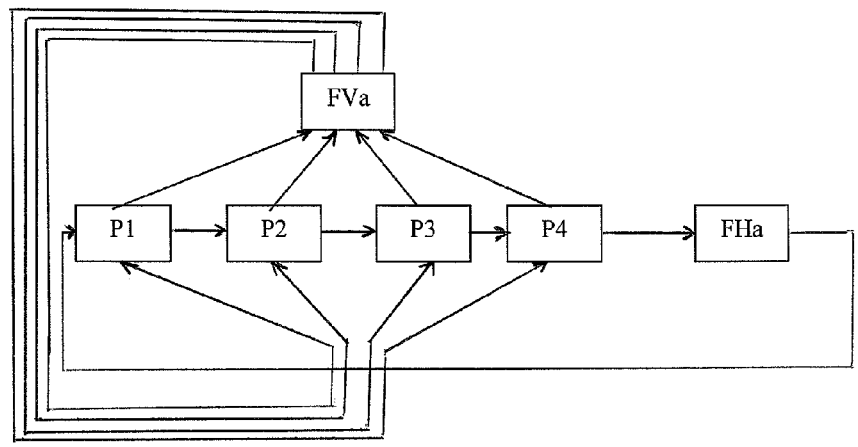
Figure 9b
Figure 9c
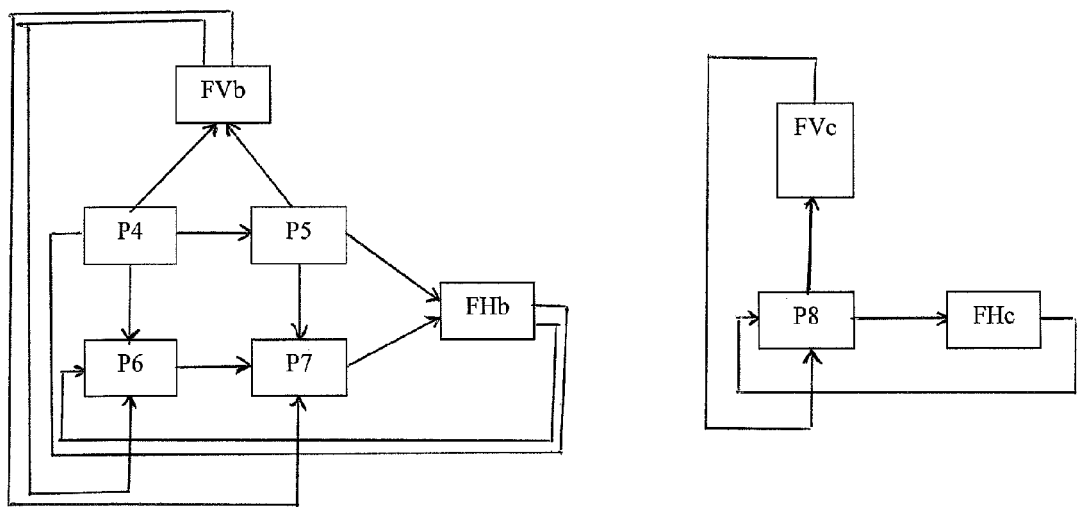

METHOD FOR PROCESSING AN OBJECT ON A PLATFORM HAVING ONE OR MORE PROCESSORS AND MEMORIES, AND PLATFORM USING SAME

The present invention relates to a method for processing, on a platform having one or more processors and memories, an object consisting of elementary information. It further relates to a platform using such a method.

In the present description, an elementary information is an element of information to be processed, represented by one or more numerical values. This information can be coded according to diverse types of coding such as 8 bit coding, 10 bit coding, or even 16 bit signed coding. In the case where the object to be processed is an image, the elementary information will be the pixels of this image.

The processing, which will be applied to the object in the platform, corresponds to an algorithm, capable of intervening in diverse fields, such as, for example, image processing, data compression and decompression, audio processing, signal modulation and demodulation, measurement, data analysis, database indexing or searching, viewing by computer, graphic processing, simulation or any field involving a high quantity of data.

When processing is required, in a platform with processor and memory, of an object consisting of elementary information of same type, there is a high latitude for determining the processing order for elementary information, loops and the corresponding operation sequence.

Nevertheless, restrictions relating to code size, calculation time, memory access speed, memory size and regularity, can be contradictory and it is difficult to exploit the parallelism of a platform to the best for a given algorithm.

To solve this problem, conventionally the use of low-level libraries capable of carrying out diverse processing operations on physical blocks, such as convolutions, multiplications, or even the application of correlation tables, is known. This only allows once-only optimisation of these libraries for each platform. Nevertheless, there are many disadvantages to this method:

the size of libraries, and therefore the size of the code, is significant, given the library call times, physical blocks of a relatively significant size need to be used, which results in significant memory use, given that the internal loops on the elementary information are located inside the libraries, sequences of operations cannot be optimised, which results in limited performance, and the physical blocks are stored in memory, which results in intensive memory use and much time spent writing and reading intermediary data from the memory.

Furthermore, the programmable processors, for example of the scalar processor type, vector signal processor type, signal processing processor type, notably of SIMD ("Single Instruction Multiple Data") type, enable the application of an algorithm to an object made up of elementary information and decomposed into blocks, or sub-objects, i.e. into groups of elementary information.

Conventionally, each operation is applied to a full block, then the next operation is executed on a block which it has been possible to reduce in size. Indeed, some of these operations reduce the size of blocks, generating edge effects when the subsequent operations are performed. Subsequently, when algorithms are to be applied with a known processor, a high number of memory access operations are necessary, since one operation is applied to all the blocks, in succession, before proceeding to the next operation, this situation causing frequent reading and writing in the memory.

It is also necessary to use blocks of large size to reduce edge effects, and it is therefore necessary to have a memory of relatively high size to be able to store these large-sized blocks. Furthermore, a large quantity of loops means that the loop and end-of-loop initialisation code is present a large quantity of times, thereby inducing a large size of code.

Furthermore, certain operations such as correlation tables, or application of a local displacement, are unsuitable for integration into a vector signalling processor equipped with a communication schema by offset or permutation.

Furthermore, it has been noted that the code presents regularity problems, since the size of blocks on which the operations are applied vary from one operation to another. It is therefore difficult to optimise this code in terms of memory and/or calculation time, since the optimisations are limited to one operation per block, rather than the full sequence.

It is therefore very difficult to optimise the size of the code, the size of the memory and the quantity of instructions required, without spending a considerable amount of time optimising each algorithm+platform combination. Indeed, each platform has its own characteristics, both in terms of equipment (for example, the number and type of processors or size and type of memory) and in terms of language used (C for a scalar processor and assembly language for a vector signal processor).

The aim of the invention is a method enabling the processing of an object in a platform, by remedying at least one of the aforementioned drawbacks. Notably, the invention enables optimisation of processing in terms of code size, calculation time, memory access speed, memory size.

This optimisation reduces an algorithm's calculation time and the electric consumption necessary for a calculation power and a memory size, and thereby a silicon surface, data.

It further enables economies to be made on hardware properties such as the silicon surface, and the electric consumption required for the execution of an algorithm for a given calculation time.

The invention thus relates to a method for processing, in a platform having one or more processors and memories, an object consisting of elementary information of same type, said method comprising the step of decomposing the object to be processed into at least two sub-objects consisting of N elementary information each, all sub-objects having the same quantity N of elementary information and, the processing consisting in performing at least one sequence of specific operations on each sub-object's elementary information, the method further comprising the step of performing, for each sub-object, each specific operation at least N times, such that, on one hand, each elementary information for each sub-object is applied at least once, and, on the other hand, N results for each specific operation are produced, the sequence of specific operations being such that at least one specific operation k of the sequence produces at least once throughout its N applications, a result used for the processing of another sub-object.

Preferably, the sequence of specific operations does not include loops.

In one embodiment, the platform comprises Q processors. Preferably, the processing of each sub-object is distributed across the Q processors, which each perform at least one specific operation IS8 from the specific operations sequence. Such that all processors are used for each sub-object and such that one same processor is used for the set of sub-objects. The sub-objects do not therefore need to be assigned to the processors.

Preferably, when a specific operation is performed by a processor to process a sub-object, the same specific operation is also performed by the same processor for processing all the other sub-objects. The processing is therefore regular: the specific operations are assigned to the processors and then performed periodically for each sub-object sub-processing operation.

Preferably, the set of loops necessary for the processing depend on the topology of the object and on the platform, but are independent from the sequence of specific operations.

Preferably, the loops are embedded into each other around the full sequence of specific operations. In this manner, the loops encapsulate the whole of the sequence of specific operations and the sequence of specific operations is not divided into sub-sequences each surrounded by loops. In the same manner, the object can be processed by processing a sub-object at the same time without it being necessary to store the full object or to store the set of results for a specific operation, but only storing, temporarily, the results which are necessary for the processing of another sub-object. The memory use is thereby reduced.

Preferably, the sub-objects are made up of contiguous elementary information. This enables the application of processor chaining comprising at least one queue.

The notion of queue, according to the invention, will now be defined.

A queue is used to transmit and/or store elementary information or results from specific operations.

A queue can comprise or use a memory.

A queue can be implemented using one or more processes of FIFO (First in first out) type.

A queue comprises at least one input and at least one output.

A queue can be connected operationally via any means to an input calculation unit and to an output calculation unit.

A queue can also be connected operationally via any means to PR input calculation units and PR output calculation units, in this case the queue behaves like PR queues each linking an input calculation unit to an output calculation unit.

Preferably, a queue can be used to manage several data fluxes independently, each flux being associated to a determined specific instruction.

In one embodiment, it is possible to read and write simultaneously in a queue.

Preferably a queue uses at least one memory unit to store, for each flux, an identical quantity NF of data.

Preferably NF is determined according to the relative disposition of the sub-objects and to the scrolling mode, such that NF-1 sub-objects be processed between the processing of a sub-object producing data and the processing of the sub-object using the same data.

Preferably, a chaining comprising calculation units and a queue, includes a mechanism enabling management of the booting operation: the queue is initialised in a regular manner, for example at the beginning of each line if the queue is part of a horizontal chaining and the object is an image; provided that the queue does not comprise NF data, the processor following the queue in the chaining, takes as input the data that it sends in output; next, the processor following the queue in the chaining takes the oldest data in the queue in input and removes it from the queue.

Preferably the queue enables outputting data in the same order as they have been input in the queue.

Preferably, the cyclic chaining is unidirectional. Preferably, the cyclic chaining is such that there is one single link in input and one single link in output per calculation unit.

The use of at least one queue thus enables the transmission of results from specific operations required in the calculation of at least one other sub-object.

A queue is, for example, implemented using a microprocessor.

It can be noted that, throughout the full description, the terms "calculation unit" and "processor" have the same meaning.

In one embodiment, to process a sub-object made up of N elementary information, each specific operation for the sequence is carried out N times in total and N/Q times by each of the Q processors. In the case where the sequence of specific operations includes conditional connections, each processor performs the part of the sequence, accounting for these conditional connections.

In one embodiment, the sub-objects are not overlaid according to at least one dimension. Such that, at least one specific operation result produced during the processing of a sub-object is used during the processing of another sub-object.

Preferably, the sub-objects are not overlaid according to any dimension. Such that each processor can be used at 100% without repeating the calculation.

Preferably, the sequence of specific operations is such that at least one specific operation k of the sequence produces at least once during its N applications, a result used for processing another sub-object.

Preferably, in the case where there are several cyclic chainings according to one same dimension of the sub-object (notably when the processors are disposed according to a grid), the queue is shared between all the cyclic chainings according to the same dimension. Preferably, there is exactly one queue for each of the sub-object's dimensions, and each queue is shared between all the cyclic chainings according to the same dimension. Such that the communication between the processors is particularly simple. Such that the organisation of the memory is particularly simple.

The invention further permits obtaining a performance, for a given algorithm, that is proportionate to the number of processors, without changing the algorithm nor the memory size, and whilst using small-sized processors.

Thus, the invention makes it possible to render available, on a component, a calculation power of several dozen billion operations per second per $mm^2$, for a component engraved with a $0.09\mu$ process. Conventionally, such densities require an optimised cabled architecture, which is therefore timely to develop, and has no flexibility for changing algorithms. On the contrary, the invention makes it possible to program any algorithm with great ease and therefore within a very short time.

This also renders attainable, on a single component, performances in the order of thousands of billions of operations per second.

For this purpose, the invention renders regular a processing operation composed of operations presenting edge effect.

The objects processed by a method such as the one described above are preferably unprocessed images (of "raw" type) before demosaicing operation, in which case:

in one alternative, the elementary information is a pixel represented by a numerical value corresponding, according to the absolute position of the pixel, for example to red, green or blue in a further alternative, an elementary information is a group of pixels (for example a group of 2*2 green, red and blue pixels, green corresponding to a "Bayer") represented by one numerical value per pixel.

The objects can also be visible images, in which case the elementary information is a pixel represented, for example, by three numerical values, each value representing a colour, for example red, green and blue.

The objects can also be sequences of images, notably unprocessed or visible images, in which case the elementary information is a pixel of an image from the sequence of images. The objects therefore correspond, for example, to videos.

In the case where the object is an image, the image can be received from an image capturing device and/or destined to an image rendering device:

An image capturing device is, for example, a disposable camera, a digital camera, a reflex camera (digital or not digital), a scanner, a fax, an endoscope, a video-camera, a camcorder, a surveillance camera, a toy, a video camera or a camera integrated or linked to a telephone, to a personal assistant or to a computer, a thermal camera, an ultrasound machine, a MRI (magnetic resonance) imaging unit, an X-ray radiography unit.

An image rendering device is, for example, a screen, a projector, a television, virtual reality goggles, or a printer.

An image capturing and image rendering device is, for example, a scanner/fax/printer, a compact photograph printing lab, a videoconferencing device.

The processing platform can take different forms, depending on the application. For example, in the case where the object is an image, the case will be cited notably where the processing platform is integrated into one of the following devices:

An image capturing device which produces processed images, for example a digital camera which integrates a processing platform.

An image rendering device which displays or prints processed images, for example a video projector or a printer including a processing platform.

A mixed device which corrects faults on these elements, for example a scanner/printer/fax including a processing platform.

A professional image capturing device which produces processed images, for example an endoscope including a processing platform.

The processing platform can be fully or partially deported on a server.

An algorithm, or an object processing operation, corresponds, for example, without this list being restrictive, in the case where the object is an image, to:

a calculation, notably statistic-based, for automatic white balance, and/or a calculation, notably statistic-based, for automatic exposure, and/or a calculation, notably statistic-based, for automatic focussing, and/or a calculation, notably statistic-based, for automatic contrast improvement, and/or a conversion of unprocessed image into visible image ("image pipe" or "Image Signal Processing (ISP)"), and/or a correction of optic faults, and/or an improvement in depth of field, and/or a processing operation as described in patent request PCT/FR2006/050022 "Method for creating an image capturing and/or rendering device, and device obtained by this method" and/or in patent request PCT/FR2006/050197 for "Method for commanding an action, notably a modification of sharpness, using a digital colour image, and/or a correction of sensor faults, and/or a correction of imager faults, and/or a processing operation, notably improvement of sharpness, and/or a processing operation, notably improvement of colour rendition, and/or a processing operation, notably improvement of contrast rendition, and/or, a processing operation, notably improvement of detail rendition, and/or a noise reduction, and/or a measurement, and/or a compression, and/or a decompression, and/or an interpolation or zoom, and/or a scan, and/or a special effect.

According to the invention, the processing operation applied to the object can consist in a sequence of operations, also called specific operations. Results from specific operations are also called elementary information and can be, or not be, of same type as the object's elementary information.

The sub-objects are sets of elementary information having a form and a size which, depending on the case, depend on the platform's characteristics, notably in terms of size and type of memory as well as, in the case of a vector signal processor, in terms of the size of a vector, but also the characteristics of the object to be processed.

In one embodiment, the objects and sub-objects, as well as the logical blocks, have several dimensions.

The dimensions of the sub-objects and the logical blocks correspond to all or a part of the object's dimensions. The dimensions can be of different types, notably:

spatial, for example a distance, an angle or a scrolling in a mesh, temporal, frequency, for example colour, a frequency, a frequency band a phase, a decomposition according to a vector space base, for example a decomposition into wavelets, or a decomposition into high bytes, low bytes generally, the dimensions of any space of any topology.

The following non-exhaustive list provides examples of objects with their dimensions:

a still image with 2 dimensions, each corresponding to distances, notably measured in pixels, an unprocessed still image with 2 dimensions, each corresponding to distances, each pixel being equipped with a colour, for example red, green or blue, a still colour image, with 2 dimensions, each corresponding to distances, and one dimension corresponding to a frequency representing the colour channel, for example red/green/blue, a moving image with 3 dimensions, 2 of which correspond to distances, notably measured in pixels, and one of which corresponds to time, an image in relief with 3 dimensions, corresponding to distances, an image in relief with 3 dimensions, 2 of which correspond to distances, and the third corresponding to a viewing angle, a medical image with distance dimensions and possibly channel dimensions, a hologram with viewing angle dimensions,
more generally, an image with distance and/or angle and/or temporal, and/or frequency dimensions,
a sound with a dimension corresponding to time,
a sound with 2 dimensions, corresponding to time and to a channel,
a modulated signal with one or several dimensions corresponding to time and, possibly, to a frequency and, possibly, to a position in space or an angle,
signal modulation and demodulation, measurement, analysis of data, database indexing or searching, viewing by computer, graphic processing, simulation shown by elementary information disposed according to one or more dimensions,
more generally, an object with one or more dimensions.

According to the invention, an object's elementary information can have an absolute position and/or a scale, notably spatial and/or temporal and/or frequency and/or in any other one of the object's dimensions:

an elementary information for an "audio" object can correspond to an intensity; in this case, the elementary information has an absolute position corresponding to a given moment in time and, in the case of a multi-channel sound, to a given channel.

an elementary information for an "image" object can correspond to a pixel; in this case, the elementary information has an absolute position corresponding to a position in the image and, in the case of a video image, to a given moment in time.

an elementary information for a "data simulation" object can correspond to a status; in this case, an elementary information has an absolute position corresponding to a meshing node and to a given moment in time.

an elementary information for a "modulated signal" object can correspond to an intensity and/or a phase; in this case, an elementary information has an absolute position corresponding to a given point in time and, possibly, to a given frequency and/or to a given position, if several antennae or transmitters are used.

The relative positions and the absolute or relative scales, according to at least one dimension, notably spatial and/or temporal, can correspond to diverse concepts depending on the type of object. They are applied between any 2 blocks, whatever their type (in the case of an image as described above, a logical block can notably be unprocessed, red, green, 8 bits . . . ).

In the case where the object is a still image with square pixels, the absolute or relative position can correspond, in one embodiment, to 2 values (vertical and horizontal) and the absolute or relative scale to 2 values (vertical and horizontal). The pixels of the top line of an object can have as absolute positions (0;0) (0;1) (0;2) . . . , and the pixels of the n th line can have as absolute positions (n;0) (n;1) (n;2). In this case, the relative positions can be coded in the following manner: (−1; 0) indicates at the top, (0; 0) corresponds to a null displacement, (0;1) indicates on the right and (2; −2) indicates 2 pixels below and 2 on the left; a relative scale of (0.5;0.5) then corresponds to a half resolution in each direction.

More generally, a combination of relative displacement and relative scale can be coded using 2 functions f and g in the following manner: (f(x;y);g(x;y))) for each pixel of absolute position x,y. It should be noted that a rounding off rule is necessary in order to take, for example, the nearest pixel. Thus:

a relative position above is coded with f(x;y)=−1 and g(x;y)=0 a relative scale of 0.7 is coded with f(x;y)=0.7*(x−x0) and g(x;y)=0.7*(y−y0); x0 and y0 corresponding to a parameter relative to an absolute position;

a distortion correction is coded with f and 9 corresponding to the distortion field a YUV 4:2:2 format change i.e. YYUV using separate Y, U and V brightness and chrominance information can use, to obtain Y1 Y2 xx xx Y3 Y4 xx xx . . . using Y1 Y2 Y3 Y4 . . . , the subsequent functions f(x;y)=(x−x0)*0.5 if x even, and (x+1−x0)*0.5 if x−x0 odd and with f(y)=y−y0; x0 and y0 corresponding to a parameter relative to an absolute position;

The following non-exhaustive list provides other examples of embodiments with various different type of objects:

In the case where the object is a still image with hexagonal pixels positioned by line, two successive lines being offset by a half-pixel, the absolute or relative position can correspond to 2 values (vertical and horizontal) and the absolute or relative scale to 2 values (vertical and horizontal); the pixels of the top line of an object can have as absolute positions (0;0) (0;1) (0;2) . . . , and the pixels of the n th line can have as absolute positions (n;0.5) (n;1.5) (n;2.5) if the line is an odd line, and (n;0) (n;1) (n;2) if the line is an even line. The relative position can correspond to 2 values (vertical and horizontal), for example (−0.5; 0.5) indicates at the top right, (0.1) indicates on the right and (−0.5; 1.5) indicates the pixel located to the right of the top right pixel. A relative scale of (0.5;0.5) then corresponds to a half resolution in each direction. Also, a combination of relative displacement and relative scale can be coded using 2 functions f and g in the following manner: (f(x;y);g(x;y))) for each pixel of absolute position x,y. It should be noted that a rounding off rule is necessary in order to take, for example, the nearest pixel.

in the case where the object is a moving image with square pixels, the absolute or relative position can correspond to 3 values (vertical, horizontal and temporal), for example, (−1; 0;0) indicates the pixel located at the top in the same image, (0; 0; −1) indicates the pixel with the same position in the previous image and (2; −2, −1) indicates the pixel located 2 pixels below and 2 to the left in the previous image. Also, a combination of relative displacement and relative scale can be coded using 3 functions f, g, h in the following manner: (f(x;y;t);g(x;y;t)); h(x;y;t)) for each pixel of absolute position x,y at time t. It should be noted that a rounding off rule is necessary in order to take, for example, the nearest pixel.

in the case where the object is a single-channel sound, the absolute or relative position can correspond to 1 value (temporal); for example (−1) indicates the previous time, and (2) indicates 2 times after; a function f(t) then permits coding of a displacement and relative scales. A rounding off rule being used to take the nearest time.

in the case where the object is a multi-channel sound, the absolute or relative position can correspond to 2 values (temporal, channel); for example (−1, 0) indicates the previous time for the same channel, and (2,1) indicates 2 times after for the following channel, organised for example spatially in a cyclic manner. Also, a combination of relative displacement and relative scale can be coded using 2 functions f, g in the following manner: (f(t;c);g(t;c)) for each audio sample positioned at the time t for the channel c. It should be noted that a rounding off rule is necessary in order to take, for example, the nearest time and channel.

in the case where the object is a simulation mesh, the absolute or relative position can correspond to n values, each corresponding to a spatial or temporal dimension according to the meshing's topology. Also, a combination of relative displacement and relative scale can be coded using n functions. It should be noted that a rounding off rule is necessary in order to take, for example, the nearest node and time.

In the case where the object is a modulated signal, the absolute or relative position can correspond to n values, corresponding respectively to time, where applicable to the frequency channel (transmission or reception on several frequencies) and where applicable (several transmitters or receivers positioned spatially) to a spatial dimension. Also, a combination of relative displacement and relative scale can be coded using n functions, and a rounding off rule must be chosen.

in the case where the object is a set of measurements, the absolute or relative position can correspond to n values, each corresponding to one of the object's dimensions which, depending on the case, may be of temporal, spatial, frequency, phase or other type. Also, a combination of relative displacement and relative scale can be coded using n functions, and a rounding off rule must be chosen.

in the general case where the object is of n dimension, the absolute or relative position can correspond to n values each corresponding to one of the object's dimensions which, depending on the case, can be of temporal, spatial, frequency, phase or other type. Also, a combination of relative displacement and relative scale can be coded using n functions, and a rounding off rule must be chosen.

Different types of sub-objects without overlay are illustrated by FIGS. 1a to 1d. In these figures, it is shown that one same image can be divided into lines (lines 90, 91, 92 and 93 in FIG. 1a), into columns (columns 94, 95, 96 and 97 in FIG. 1b), into sub-objects of any other form (forms 70, 71, 72 and 73 in FIG. 1c), or even into rectangles (forms 60, 61, 62, 63, 64, 65, 66 and 67 in FIG. 1d). In the case where sub-objects have no overlay, elementary information for one minus another sub-object needs to be accessed to process a sub-object's elementary information without losing edge during the calculation of filters.

Thus, in one embodiment, the object to be processed having dimensions DO, and being decomposed into sub-objects having dimensions DSO selected from the object's dimensions DO, the object's decomposition is such that, according to at least one of the sub-object's dimensions, the sub-objects have no overlay.

In this configuration, it is not necessary to recalculate the specific instructions applying, directly or indirectly, elementary information belonging to two sub-objects.

In a preferred embodiment, the method further comprises the step of performing, for each sub-object, each specific operation exactly N times. Preferably, DSO would be equal to DO.

In one embodiment, the method further comprises the step of adding at least one elementary information to the object such that it can be decomposed into sub-objects without overlay.

The decomposition into sub-objects can also depend on the sequence of operations to be performed on the object, notably on the number and type of filters, horizontal or vertical, present in this sequence.

Furthermore, when some of the sequence's specific operations have edge effects, it is necessary, so that no elementary information be lost during the execution of the algorithm, to decompose the image into sub-objects with a non-null overlay. This configuration is illustrated in FIGS. 1e and 1f. FIG. 1e shows a sub-object comprising 6×6 elementary information in the case where the sequence of operations loses a pixel on each edge, and FIG. 1f shows an object comprising 100 elementary information.

In this FIG. 1e, it is shown that the sub-objects are four rectangles 80, 82, 83 and 84, each containing 36 elementary information. The rectangle 80 is made up of 36 elementary information located top left in the image, and the rectangle 82 is made up of 36 elementary information located top right in the image. Thus, the 8 elementary information 86 are common to both sub-objects 80 and 82. Also, the 8 elementary information 85 are common to both sub-objects 80 and 83. Also, the 8 elementary information 88 are common to both sub-objects 82 and 84. Also, the 8 elementary information 89 are common to both sub-objects 83 and 84. Lastly, the 4 elementary information 87 are common to all four sub-objects 80, 82, 83 and 84.

In the case where the object is an image, in one embodiment the image is decomposed into juxtaposed rectangular sub-objects, the sub-objects are processed, for example, from left to right then from top to bottom. Depending on the platform, the sub-objects are selected and stored according to one of the following manners, without the list being restrictive:

in the case of a signal processing processor, with a small quick-access memory and a large slow memory, the size of the sub-objects is chosen to be able to process a sub-object without accessing the slow memory; it would be possible, for example, to take sub-objects corresponding to squares of 32×32 pixels, the result of the calculation on the previous sub-object being transferred to slow memory during the calculation relative to the current sub-object, and during the transfer from the slow memory to the quick-access memory of data required for the calculation relative to the following sub-object, in the case of a scalar processor with a small cache memory and a large slow memory, the size of sub-objects is chosen to be able to carry out the processing of a sub-object using the cache memory as much as possible; it would be possible, for example, to take sub-objects corresponding to squares of 32×32 pixels or sub-objects of 1 pixel or sub-objects of 4 pixels (2*2) or of N1*2 pixels, notably in the case of an unprocessed image, of "raw" type, in the case of a vector signal processor, the size of sub-objects is chosen as equal to or multiple of, the size of a vector that the platform is capable of processing and storing, sub-objects corresponding to 64 horizontal pixels could be taken, for example.

In the case where the object is of a different type to an image, the decomposition into sub-objects can be adapted in a similar way to the platform.

The method according to the invention enables the regularisation of the sequencing schedule for specific operations performed on the sub-objects, since the same quantity N of operations is performed each time. The hardware architectures and algorithms can thereby be simplified. The execution of N operations at each time is made possible by the fact that, in the execution of these operations, elementary information is applied which belongs to a sub-object different from that on which the operations are applied.

In this manner, the elementary information on which the operation k is applied can belong to the same sub-object or to different sub-objects, according to the type of specific operation and the position of elementary information in the sub-objects.

This also prevents the occurrence of "edge effects" at the boundaries of the different sub-objects. Indeed, using N specific operations producing N results at each time obliges processing all the elementary information, including that located on the edge of a sub-object. In this case, during the execution of operations, elementary information belonging to the other sub-objects is called upon.

Furthermore, this method enables the application of several successive specific operations to one same sub-object, for example, a line of an image, before proceeding to the next sub-object. Thus, the number of memory access operations can be reduced since one line can be read and applied to several specific operations before writing only results necessary for the processing of other sub-objects in the memory and proceeding to the next line.

In one embodiment, the platform comprises at least one inter-object communication memory for storing the elementary information and/or results from specific operations calculated during the processing of a sub-object and used for the processing of another sub-object. Thus, redundant calculations are reduced.

In a still further embodiment, the sequence of specific operations only comprises one single specific operation applying th same data during the object's processing.

Hereafter, "communication data" will designate elementary information and/or results of operations which are used for the processing of several sub-objects or for several different specific operations.

Preferably, communication data between sub-objects will be chosen such that their size and the number of calculations be minimised.

For example, the inter-object communication data according to one dimension comprises, notably, the input data for a filter according to this dimension, as well as the data to be combined with the filter output, if these are not aligned correctly in relation to each other.

The inter-object communication memory, i.e. the memory used to store the inter-object communication data, is different by nature according to the required storage duration and the speed. For example, this memory can consist in registers and/or in local memory, for the communication according to the dimension of the internal sub-object scrolling loop, and/or in a local and/or shared memory for the communication according to the other dimensions.

In one of the invention's embodiments wherein the object comprises dimensions DO, the elementary information is transmitted to the platform first according to a selected DE dimension, then according to the other dimensions. In this embodiment, the sub-objects have dimensions DSO, selected from the object's dimensions DO, and comprising the DE dimension, and the processing includes at least one internal sub-object scrolling loop performed according to the DE dimension.

An internal loop corresponds to a loop for processing a sub-object, which enables processing N data using Q processors.

This embodiment is particularly adapted to the case of a component processing data "on the fly", i.e. in real time at the speed at which the elementary information is input into the platform, using, for the inter-object communication, a memory located on the same component as the calculation units used for the processing operation. Thus, the cost of the component is reduced, and the memory access speed is proportional to the number of calculation units. Notably, this embodiment is used in the case of a scalar, or vector signal, or pipeline processor.

Preferably, the sub-objects are such that DSO equals one, or DSO equals two in the case of a "raw" image. In the latter case, the size of the sub-object in the second dimension is two.

Preferably, the specific operations are performed by calculation units disposed according to the DE dimension.

Preferably, the size of sub-objects in each dimension is a multiple of the size of the matrix of processors in the dimension in question.

Preferably, the dimensions DSO are the DE dimension, as well as the smallest of dimensions DO to reduce the required inter-object communication memory.

Preferably, there is no overlay of sub-objects in any of dimensions DO, such that each elementary information is only processed once; such that the loops are embedded, such that the code is compact.

Preferably, no calculation is re-calculated during the processing of 2 sub-objects Preferably, the sub-object scrolling loops are embedded following the same order as the dimensions according to which the elementary information arrives on the platform.

In one embodiment, wherein the object comprises dimensions DO, the elementary information is transmitted to the platform according to the object's DE dimension, then according to the other dimensions. In this embodiment, the sub-objects comprise the object's dimensions DO or dimensions DO-1 selected from the object's dimensions DO, the DE dimension not being included. The processing further includes at least one internal sub-object scrolling loop performed according to the DE dimension.

In a further embodiment, the size of sub-objects in each dimension is determined according to the size of the object, and/or the transmission speed of elementary information transmitted to the platform, and/or the platform's calculation speed and/or the size and the speed of at least one of the platform's memories.

This embodiment is particularly suitable for the case of a component processing data "on the fly" at the speed at which elementary information is input into the platform, using, for the inter-object communication, a local memory located on the same component as the calculation units used for the processing operation, acting as a relay for a slower shared external memory used for the long-term storage of communication data according to DO-1s, one dimension not corresponding to DE. In this case, the size of the local memory increases with the size of the sub-object, the speed with the shared memory decreases with the size of the sub-object and the size of the external memory increases with the size of the sub-object according to the dimensions other than the DE dimension, the size of internal and external memories and the speed of the external memory can thus be adjusted by adjusting the size of the sub-object. The cost is thus reduced, the speed with the memory is independent from the object's size, and a component can be optimised for an object size and re-used with an external memory for objects of larger size.

This embodiment is also more specifically adapted to the case of a component processing elementary information slower than the speed at which elementary information is input into the platform, and using a memory to store the object during the processing operation. In this case, the purpose is to limit the size of the internal memory and the processing speed to reduce the required internal memory size, number of calculation units and memory speed.

This embodiment applies notably to a scalar or vector signal or pipeline processor.

Preferably, the specific operations are performed by Q calculation units disposed according to a size dimension greater than Q.

Preferably, the size of sub-objects in each dimension is a multiple of the size of the matrix of processors in the dimension in question.

Preferably, the dimensions DSO are, excluding the DE dimension, the smallest of the dimensions DO to limit the required inter-object communication memory.

Preferably, there is no overlay of sub-objects in any of the dimensions DO, such that it is possible to process each elementary information once only. The loops are thus embedded and the code is compact.

Preferably, there is no overlay of sub-objects and no calculation is re-calculated during the processing of 2 sub-objects in the small-size dimensions, whilst in the large-size dimensions it is less important since the recalculations represent a marginal cost.

Preferably, during the calculation of the current sub-object, the inter-object communication data produced during the calculation of the previous sub-object is transferred from the local memory to the external memory, and the inter-object communication data required for the calculation of the subsequent sub-object is transferred from the external memory to the local memory. Since the internal sub-object scrolling loop is carried out according to the DE dimension, the transfers between internal and external memory only concern the inter-object communication data according to the dimensions DO-1 which exclude the DE dimension. Thus, the required local memory is limited to 3 times the size of inter-object communication data according to these dimensions DO-1 plus one times the size of inter-object communication data according to the DE dimension. For example, in the case of an image processing algorithm, the required internal memory size is limited to several hundred or thousand bytes to process several dozen million pixels per second.

Preferably, the data transits as follows: the object's elementary information is stored in the external memory, the sub-objects are read from the external memory when at least one sub-object is present in shared memory, the inter-object communication data according to the dimensions DO-1 which exclude the DE dimension are read from the shared memory, the result from the sub-object processing and the inter-object communication data according to dimensions DO-1 which exclude the DE dimension are written in shared memory, when the full data according to the dimension used for the output is present in shared memory, it is read in shared memory and is available. The transit is thereby predictable, simple and regular.

Preferably, the sub-object scrolling loops are embedded following the same order as the dimensions according to which the elementary information arrives on the platform.

The following embodiments, in the case of a vector signal processor, can apply to any processing operation on Q calculation units consisting in a sequence of specific operations performed simultaneously on the Q calculation units, this sequence not necessarily being applied to an object consisting of elementary information of same type. These embodiments describe a new way of setting up a communication between the different calculation units, for example in the case of a vector signal processor.

In one embodiment, wherein at least one part of the specific operations apply at least one parameter value, and wherein the specific operations are performed by Q calculation units calculating the same specific operation simultaneously: the sequence of specific operations comprises at least one specific selection operation which selects a parameter value from C parameter values at the same time on the Q calculation units. This selection is made in a differentiated manner by processor, according to at least one elementary information and/or at least one specific operation result and/or at least one parameter value.

In one example, C equals 8.

To calculate a correlation table, 3 specific selection operations can be used, for example, according to the input value X for the C modulo table, to obtain a, b and c function of X and to calculate $a*X^2+b*X+c$, which corresponds to a parallel calculation of Q spline functions.

To determine an interpolation filter factor corresponding to a dephasing of n/C, a specific selection operation can be used according to the input value n giving the interpolation factor.

To choose a parameter value that is function of an absolute position, a function of the position giving a result between 1 and C can be calculated, then the result from this calculation is used in input for a specific selection operation giving the parameter value for the absolute position. A defuzzying intensity function of the position can thus be adapted, for example.

To choose a differentiated value for each intertwined channel in colour, resolution . . . , a function of the position between 1 and C can also be calculated, then the result of this calculation is used in input for a specific selection operation giving the parameter value for the absolute position.

Conventionally, specific operations are known in vector signal processors which choose the data either by offset or by permutation, however the vector signal processors do not permit carrying out an indirection on data C, notably in the case where C is smaller than Q in order to optimise the processor's complexity.

In one embodiment wherein the Q processors correspond to a vector in one dimension, the C constants are extended in a register of Q constants by duplication: C constants on the right of the vector, then C constants then . . . ; the specific selection operation is used to select a value from the values C on the left of each of the vector's elements.

In one embodiment, wherein at least one part of specific operations is performed by Q calculation units calculating the same specific operation simultaneously: the sequence of specific operations comprises at least one specific selection operation performing the selection of data from C data at the same time on the Q calculation units in a differentiated manner by processor, according to a relative displacement obtained from at least one elementary information and/or at least one specific operation result and/or at least one parameter value.

For practical purposes, in the example where the Q calculation units are disposed according to a vector chained in cyclic manner, each calculation unit can access data from its neighbouring Cs on the left in a simultaneous and independent manner.

The specific selection operation can be conditional, to enable the choice from a number of 2*C, or more, data.

Thus, a local deformation can be calculated, for example a distortion according to a position, and be applied locally to a vector. Data can also be combined locally to make a filter, change scale or perform any other operation applying a local displacement.

In one embodiment, the displacement necessitating more than data C can be decomposed into at least one uniform displacement followed by a differentiated local displacement performed using at least one selection operation. The uniform displacement can be performed, notably, by application of several selection operations, or by using a communication memory.

In one example, the relative displacement is common to all the elementary information for a sub-object, and/or an object. In a further example, it is different for each elementary information and can depend, or not depend, on the absolute position of the elementary information in the sub-object and/or of the sub-object in the object. More generally, this displacement is the result of a calculation according to at least one elementary information and/or at least one specific operation result and/or at least one parameter value.

In one embodiment, wherein the sequence of specific operations includes at least one specific position operation and the object includes dimensions DO, the specific position operation produces a position information according to one of dimensions DO.

The position can be, notably, without the list being restrictive, an absolute position of elementary information in an object, a position of sub-object, a position of C modulo processor, a position of multi-scale data, a relative position with relation to a grid or any other position.

In one embodiment, the sequence of specific operations includes at least one specific operation producing a relative position according to at least one elementary information and/or at least one specific operation result and/or at least one parameter value.

The specific relative position calculation operation can be used before a specific selection operation.

In one example, the relative position is common to all elementary information belonging to a sub-object, and/or to an object. In a further example, it is different for each elementary information, or it can depend, or not depend, on the absolute position of the elementary information in the sub-object and/or the sub-object in the object. More generally, it can be the result of a calculation according to at least one elementary information and/or at least one specific operation result and/or at least one parameter value.

The size of the sub-objects, i.e. the quantity N of elementary information present in each object, is, for example, determined according to the platform's architecture used for the processing operation. Thus, in one embodiment, at least one part of the specific operations is performed by Q calculation units, Q being equal to N or a sub-multiple of N. The fact that N is a multiple of Q renders the processing operation even more regular, since all the calculation units complete a calculation step at the same time.

In one embodiment, the number of Q processors and the number of N elementary information are different, and the processing of the sub-object includes only one internal loop of N/Q iterations.

The processing is thus regular, the memory and the number of registers used are minimised, and the communication within each sub-object is performed preferably with registers.

In one embodiment, there are between several dozen and several hundred calculation units, which enables, notably, performance of calculations of several hundred operations on images with several dozen million pixels per second, using manufacturing methods for 0.13µ components.

In a further embodiment, the number of calculation units is from several thousand to several million, and the invention enables using this calculation power to process objects whilst maintaining a high programming simplicity and with a performance proportional to the number of calculation units.

To further improve this regularity, the number P of specific operations can also be a multiple of Q. Generally, the specific operations are determined upstream from the platform by a compiler, which is configured such that, if the number of specific operations is not a multiple of Q, it creates specific operations without effect in order to obtain this relation (the number of specific operations is a multiple of Q). Thus, whatever the assignment of the specific operations to the different calculation units, the processing will be perfectly regular.

In one of the invention's embodiments, all Q calculation units in the platform are identical.

Some specific operations use parameters, and, in this case, the values of these parameters are also processed. These parameters can, for example, be multiplying factors. These parameters can correspond, for example, without the list being restrictive, to:
  filter factors, and/or
  saturation values, and/or
  offset values, and/or
  correlation tables.

In one embodiment, the values of parameters used by the specific operations depend on the position in the sub-objects of elementary information applied, directly or indirectly, in these specific operations. For example, in the case where the object to be processed is an image, faults may appear on the image, due to the optic used to take the shot. These faults are not generally uniform throughout the whole image, notably on the edges.

In this case, the same compensation factors will not be applied to all the image's pixels to compensate for this blur.

For example, the use of a parameter that is common to all the elementary information, for a filter, enables an increase in the sharpness in a uniform manner.

For example, the use of a parameter dependent on the absolute position of elementary information in the object to be processed, for a filter, increases the sharpness in a more significant manner at the edge in order to compensate for an optic fault.

For example, the use of a parameter dependent on the absolute position of elementary information in the object to be processed, for a vignetting correction generates a higher compensation at the edge in order to compensate for an optic fault.

For example, the use of a parameter dependent on the absolute position of elementary information in the object to be processed for a demosaicing operation permits the "red" pixels, "green" pixels and "blue" pixels in an unprocessed image received from a sensor to be processed differently.

For example, the use of second data, notably a displacement, dependent on the absolute position of elementary information in the object to be processed for a digital enlargement calculation ("zoom") or for a distortion correction calculation, generates the pixels required for calculating the interpolation at each point.

The value of a parameter, depending on this parameter's type, can thereby:
  be constant and intrinsic to the algorithm; in this case the parameter's value can notably be transmitted to the processing means or to the platform, and/or
  depend on the object's source or destination: for example, in the case where the object to be processed is an image from a device fitted with a given optic, the parameter's value can depend on the type of optic which has an impact on the level of sharpness in the image; in this case, the parameter's value can, notably, be transmitted to the processing means or to the platform, and/or
  depend on the object to be processed: for example, in the case where the object to be processed is an image from a sensor, the parameter's value can depend on the gain of the sensor effectively used to capture said object which has an impact on the level of noise in the image; in this case, the parameter's value can notably be transmitted, selected or calculated by the platform, and/or depend on the absolute position of the elementary information in the object; in this case, the parameter's value can notably be transmitted, selected or calculated by the platform, and/or not depend on the absolute position of the elementary information in the object.

The parameter value can be determined simultaneously or a posteriori with relation to the definition of the algorithm.

Having seen that the value of certain parameters can vary from one object to another, from one sub-object to another, or from one elementary information to another.

In this case, in one embodiment, the value of the parameter is calculated at each change. In a further embodiment, the possible values for the parameter are calculated a priori, and, at each change, the index or the address is determined enabling access to the parameter's value, for example in a table.

In a further embodiment, more specifically adapted to the parameters whereby the value varies from one sub-object to another according to the absolute position of the sub-object and whereby the number of values is limited, for example the parameters corresponding to the optic sharpness characteristics, a limited number of parameter value sets are determined, each set is stored and for each sub-object, the set to be used is selected, for example by calculating a function of the position giving the address of the set to be used.

The assignment of specific operations to the calculation units depends on the type of operation, the sequence and the calculation units themselves.

For example, in one embodiment, the calculation units are specialised, i.e. the N results from one same specific operation are calculated by one same calculation unit. In the case where a specific operation calls upon a parameter present in one of the platform's memories, the fact of disposing of specialised calculation units saves time, since the calculation unit in charge of this operation can perform a memory access at the beginning of the processing, to retrieve the parameter, then apply the operation N times without having to access the memory again.

Thus, in one embodiment, when at least one specific operation applies at least one parameter, this specific operation is performed by at least one calculation unit having access to a memory unit containing a part of the parameter values, this part being determined according to the specific operations performed by this calculation unit. For the storage of these parameter values, different hardware configurations can exist, which will be described in detail below. For example, each calculation unit can have its own memory, or a memory common to all units can exist, or even the calculation units can be grouped together, and have a memory for each group.

In one embodiment, when at least one specific operation applies at least one parameter, the value of this parameter depends on the position of the sub-object and/or the elementary information in the object to be processed.

For some operations, the parameter value will be fixed for the entire object to be processed, while for others, this value will vary according to the position. Thus, for example the image blur correction factors can be more or less high depending on whether the position is in the centre or at the edge of the image.

Depending on the platform used to perform the processing operation, the configuration of the calculation units can vary. Thus, in one embodiment, the specific operations are performed by chained calculation units.

Indeed, in this case, the calculation units can be chained "in series" or according to a tree, and the results of calculations on an elementary information to be processed transit from one unit to the other. Such a configuration is rendered possible by the fact that the processing operation is regular, and that the transit of elementary information can thereby be carried out in a regular manner The calculation units can also be positioned in parallel, in order to process several elementary information simultaneously. In this case, the calculation units are chained to be able to combine the results of calculations from different elementary information for example filters.

In one embodiment, to facilitate the cabling of the component comprising the different processors, the calculation units are chained according to a chaining in one dimension. In a further embodiment, the calculation units are chained according to at least one cyclic chaining. This latter embodiment generates an uninterrupted processing operation, since an elementary information has transited through all the calculation units, and has undergone a certain number of specific operations, it is subsequently transmitted again to the first calculation unit.

In one embodiment, wherein the calculation units are chained according to at least one cyclic chaining, whereby the chaining also comprises at least one queue.

This embodiment of the method can be implemented as such.

In a further embodiment of the invention, wherein the sub-object comprises dimensions DSO, the specific operations are performed by calculation units chained according to at least one cyclic chaining for each of the sub-object's dimensions; the cyclic chaining(s) for each of the sub-object's D1 specific dimension further comprising at least one queue that is shared or not shared between the cyclic chaining(s) for the sub-object's D1 specific dimension.

This embodiment of the method can be implemented as such. It will be described in detail hereafter by means of figures. Preferably, in the case where there are several cyclic chainings according to one same dimension of the sub-object (notably when the processors are disposed according to a grid), the queue is shared between all the cyclic chainings according to the same dimension. Preferably, there is exactly one queue for each of the sub-object's dimensions, and each queue is shared between all the cyclic chainings according to the same dimension.

In a further embodiment of the invention, wherein the sub-object comprises dimensions DSO, the specific operations are performed by calculation units chained according to a DD determined dimension of the sub-object by means of at least one CC1 cyclic chaining; said CC1 cyclic chaining further comprising at least one queue. In this embodiment, the method further comprises the step, for at least one specific instruction, for each application of said specific instruction, of transmitting the result of this application of the specific instruction performed on a calculation unit UC1 to the calculation unit UC2 or queue which follows said calculation unit UC1 according to said chaining.

This embodiment of the method can be implemented as such. In one embodiment, the sub-object comprises dimensions DSO, the specific operations are performed by calculation units chained according to a DD determined dimension of the sub-object by means of at least one CC1 cyclic chaining; said CC1 cyclic chaining further comprising at least one queue; the method further comprises the step, for at least one specific operation, for each application of said specific operation of transmitting the result from said application of the specific operation performed on a calculation unit UC1 to the calculation unit UC2 or queue following said calculation unit UC1 according to said chaining of transmitting from the queue to the following processing unit UC0 in the queue, in a conditional manner according to the position of the sub-object in the object, a result of the application of the specific instruction transmitted to the queue during the processing of another sub-object.

In one embodiment, the calculation units each belong to at least one chain, and this in each of the sub-object's dimensions.

In one embodiment, the method further comprises the step, for at least two specific instructions, for each application of one of the two specific instructions, of transmitting the result of said application of the specific instruction performed on a calculation unit UC1 to the calculation unit UC2 or queue following said calculation unit UC1 according to a chaining predetermined in an independent manner for each specific instruction. In practise, the chaining used depends on the type of filter executed (vertical or horizontal for example) by the specific instruction sequence.

In one embodiment, there are two types of specific operation:
either they apply no chaining,
or they systematically apply a chaining, i.e. each time that they are performed; in this case, all the chainings applied by the same specific operation by the different processors are according to the same dimension.

In one embodiment, the specific operations are performed by calculation units chained according to at least one cyclic chaining; said chaining enabling the transmitting of the result from a specific operation to the following processor or queue in the chaining for the processor having produced said result.

In one embodiment, the specific operations are performed by calculation units chained according to at least one cyclic chaining; said cyclic chaining further comprising at least one file; said file enabling the transmitting of the results from specific operations necessary for the calculation of at least one other sub-object.

In a further embodiment, the method comprises the step of grouping together and storing in memory the results from specific operations used during the sub-processing operation of another sub-object according to the relative position of said other sub-object with relation to said sub-object.

In one embodiment, the method further comprises the step of grouping together into at least one queue the results from specific operations used during the sub-processing of another sub-object.

Furthermore, in some embodiments, the method comprises the further step of providing the platform with instructions enabling to keep in memory or in queue at least one part of these results from specific operations.

The processing operation must, of course, be adapted to the platform's configuration in order to make optimum use of this platform's hardware capacities. For this purpose, in one embodiment, the method comprises the step of assigning the specific operations to the calculation units according to the chaining of the calculation units, and according to the sequence. This step can also be performed by a compiler located upstream from the platform.

Furthermore, still in order to make optimum use of the platform's capacities, it can be interesting to use the programmable calculation units, i.e. that the sequence of specific operations and/or the assignment of specific operations to the different calculation units can be modified after creation of the component containing these calculation units. Thus, in one embodiment, the order and/or the nature of the specific operations can be modified. However, even if the calculation units are programmable, they can be programmed a first time at the time of the component's creation. In this manner, in one of the invention's embodiments, the specific operations are performed by calculation units cabled according to at least one predetermined sequence of specific operations. This embodiment, for example, avoids having to use an external memory. Indeed, rather than having such a memory containing the sequencing schedule of operations to be performed for an algorithm, the calculation units can be cabled such that the operations are performed in an order corresponding to this algorithm that is to be applied to an object.

The platform on which the processing operation is executed can have different types of memory which vary, both in terms of capacity and access speed. For example, a fast memory and/or registers can be used for short-term storage of results from operations, in the case of operations such as filters which necessitate the immediate re-use of certain data. Thus, in one embodiment, at least one specific operation is performed by at least one calculation unit equipped with a memory unit of limited capacity for storing elementary information and/or results from specific operations, this memory containing at least sixteen elementary information and/or results from specific operations. The fast memories here having generally a limited capacity, it is necessary in certain cases, to also have a memory of higher capacity in order to store more elementary information and/or results from specific operations.

For this purpose, in one embodiment, at least one specific operation is performed by at least one calculation unit having access to a communication memory unit, containing at least one elementary information and/or at least one of the specific operation results from other sub-objects.

This communication memory is, generally, used for long-term storage of elementary information and/or results from specific operations, used for processing other sub-objects. Only a part of specific operations produce or use such data, and the necessary speed is therefore limited. The regularity brought by the invention enables very simple determination of what this data is and therefore avoids having to use a cache memory mechanism, which reduces the complexity and cost of the platform. Thus, in one embodiment, the communication memory unit has an access speed less than $0.3*N$ access/sub-object/specific operation. Such a memory, with a relatively slow access speed, would be less costly than if a memory that was both fast and of high-capacity was required. This is one of the invention's advantages.

If the processing platform is such that the memory capacity is reduced, a size of sub-objects must be chosen such that a processing operation can be applied correctly. Thus in one embodiment, used notably in the case where the platform is integrated into a mobile phone, the value of Q is fixed at 1 and the value of N falls between 2 and 16. For example, if the platform is destined to process photographs taken by the mobile phone, all the operations will be applied to one single pixel at a time.

On the contrary, in certain cases such as, for example, when the platform comprises a vector signal processor, it is possible to have a high quantity of calculation units. This hardware configuration enables, if the calculation units are used judiciously, acceleration of an object's processing operation. For this purpose, in one embodiment, at least one specific operation is performed simultaneously by at least two identical calculation units. The invention thus enables, by the regularity of the processing operation, an optimum use of the processors.

Depending on the embodiments, the specific operations comprise at least one specific calculation operation from the group comprising: addition, subtraction, multiplication, application of a correlation table, minimum, maximum and selection Thus, in one embodiment, at least one specific calculation operation also performs an offset, and/or a saturation and/or a rounding off. According to the invention, the specific selection calculation operation enables choosing data from at least two data items according to the value of the third data item In one embodiment, the application of a correlation table is performed by a calculation using the table's input and a limited number of factors. In one embodiment, the limited number of factors is fixed at 8.

In addition, in other embodiments, the specific operations are performed by chained calculation units by means of at least one cyclic chaining CC1; said cyclic chaining CC1 further comprising at least one queue; at least one specific operation IS4 from the specific operation sequence transmitting the result of a specific instruction IS5 performed on a calculation unit UC1 to the calculation unit UC2 or queue which follows said calculation unit UC1 according to said chaining.

In one embodiment, the IS4 specific operation transmits, from the queue, to the calculation unit UC0 following the queue, the result of a specific operation IS5 performed during a previous sub-processing operation. Preferably the queue enables outputting data in the same order as they have been input in the queue. Preferably, a chaining comprising calculation units and a queue, comprises a mechanism enabling management of the booting operation: the queue is initialised in a regular manner, for example at the beginning of each line, if the queue is part of a horizontal chaining and the object is an image; upon the first execution of the specific instruction IS4, no data is transmitted to UC0 from the queue; next, the specific operation IS4 transmits, from the queue, to the calculation unit UC0 which follows the queue, the result of a specific operation IS5 performed during a previous sub-processing operation.

The values N and Q vary according to the embodiments. Each embodiment has different advantages. Thus, in one embodiment, N is not a multiple of Q. In one alternative of this embodiment, Q is equal to the quantity of specific operations of the sequence obtained by translating the sequence of generic operations.

In one embodiment N is a multiple of Q. This renders the processing regular. Preferably N=Q. This reduces the quantity of memory required for storing temporary results.

In one embodiment Q=1 and N=4. This permits re-using a same parameter value for several applications of one same specific operation.

In one embodiment Q>1 and N=Q. This enables the use of Q calculation units of a vector signal processor at 100%.

In one embodiment Q>1 and N is a multiple of Q. This enables the use of Q calculation units of a vector signal processor at 100%, reducing the quantity of results from specific operations performed during the processing of a sub-object and used for processing another sub-object.

In one embodiment, each processor performs all operations of the sequence of specific operations.

In one embodiment, all the processors perform the same specific operation at the same time. In a further embodiment, all the processors perform the same specific operation successively, which enables carrying out recursive filters.

The storage in memory of elementary information and operation results necessitates the use of relatively simple addressing, in order not to waste too much time during the elementary information search. For this purpose, in one embodiment, at least one part of specific operation results is stored in memory at an address in the format "base address+offset" or "base address+modulo offset (size of a buffer memory)", the offset being constant for all the results from one same specific operation. The buffer memory is, preferably, integrated into one of the processing platform's memories. Notably, the buffer memory can be a queue.

In a further embodiment, the base address is modified each time that a sub-object is changed in the processing operation.

In one embodiment, this addressing can be used notably for data for communication between the sub-objects according to at least one dimension.

In the specific case of a vector signal processor, the address calculation is common to all the processors and a memory delivering groups of elementary information and/or of specific operation results for the size of a sub-object can be used.

It has been shown above that, in certain hardware configurations, each calculation unit had its own memory. In this case, a given address can be relative to several memories, i.e. a memory address as defined here in fact represents all the memory addresses used by all the calculation units performing one same specific operation.

In one embodiment, at least one part of specific operation results is stored in memory at an address predetermined for all the results from one same specific operation.

The above method is such that the number of calculation units required to perform the processing operation can be relatively low. Thus, in one embodiment, when the specific operations are performed by at least one calculation unit equipped with at least one unit of registers and at least one sub-object communication memory, the number of transistors on the processing platform is lower than 10,000 per calculation unit, including the unit of associated registers without the communication memory.

In one of the invention's embodiments, the platform is provided, preferably directly, with specific formatted data calculated on the basis of generic formatted data, this generic formatted data comprising the first data describing at least one sequence of generic operations, the calculation of specific formatted data being performed accounting for a scrolling mode for elementary information in the platform and specific operations from generic operations, these specific operations forming the sequence of specific operations to be performed on an object during its processing in the platform. Thus, the object's processing can be modified easily by changing the generic formatted data and obtaining automatically specific formatted data optimised for the platform. Such that the time taken for the market release of the platforms is speeded up. Such that the code size, the calculation time and the quantity of memory be optimised. Such that the electric consumption and the cost of the platform are lowered.

Generic operations are operations which are applied to logical blocks, i.e. abstract entities, without notion of size nor format, made up of elementary information, and able to constitute all or part of the object.

In the present description, generic formatted data is digital data used for describing a processing operation to be performed on an object by a data processing platform, independently of the platform itself. The specific formatted data can be provided directly or indirectly using a compiler to generate a binary code adapted to the platform using specific formatted data.

There are different possible scrolling modes, some of which will be described further below. Using these scrolling modes, the specific operations to be applied to the object to be processed can also be generated. This enables the market release of algorithms within a relatively short period of time.

In one embodiment, the generic operations comprise at least one elementary generic operation included in the group comprising: the addition of logical blocks and/or parameters, the subtraction of logical blocks and/or parameters, the calculation of the absolute value for the difference between the logical blocks, multiplication of logical blocks and/or parameters, the maximum of at least two logical blocks and/or parameters, the minimum of at least two logical blocks and/or parameters, the application of a correlation table, the conditional choice of logical blocks and/or parameters, this choice being made as follows: if a>b, c is selected, otherwise d is selected, wherein a, b, c and d are logical blocks and/or parameters, the histogram for a logical block, the change of scale for a logical block, and an operation producing a block containing at least one coordinate.

In a further embodiment, the elementary information is represented by numerical values in fixed point, and the generic operations include offset operations, a saturation operation and/or at least one elementary generic operation combined with this saturation operation.

All hardware characteristics that have just been defined are, obviously, valid whatever type of platform is used and whatever type of object is to be processed.

Thus, in one embodiment, the object to be processed is an image, and the elementary information are pixels of this image. In this case, the processing platform is, for example, part of an image capturing and/or rendering device, and the operations apply parameters with values that depend on the sequence of operations and/or on the processing platform and/or on the object to be processed, these parameter values being linked to the characteristics of the optic and/or of the sensor and/or of the imager and/or of the electronics and/or of the software for the image capturing and/or rendering device. The characteristics can be, for example, intrinsic fixed characteristics for all the objects or variables according to the object, for example noise characteristics which vary according to a sensor's gain. The characteristics can also be identical for all the elementary or variable information according to the absolute position of the elementary information, for example the optic sharpness characteristics.

In other embodiments, the object to be processed is a digital audio signal and the elementary information consists in the audio samples for this signal, or even the object to be processed is a numerical mesh and the elementary information are spatial and temporal information characterising each point of the meshing.

The invention also relates to a platform having one or more processors and memories, destined to process an object (55) consisting of elementary information of same type (54, 56, 58, 60, 154, 156, 158, and 160), comprising means for decomposing the object to be processed into at least two sub-objects (50, 51, 52 and 53) consisting of N elementary information each (54, 56, 58, 154, 156, 158), all the sub-objects (50, 51, 52 and 53) having the same quantity N of elementary information and, means for performing at least one sequence of specific operations on each sub-object's elementary information (50, 51, 52, 53), these processing means further comprising means for performing, for each sub-object, at least N times each specific operation, such that, on one hand, each elementary information for each sub-object is applied at least once, and, on the other hand, N results for each specific operation are produced, the processing means being such that at least one specific operation (62) of the sequence of specific operations applies, directly or indirectly, at least once throughout its N applications (62a, 62b, 62c, 62d, 62e, 62f), an elementary information belonging to another sub-object (60, 160).

In one embodiment, the object to be processed comprises dimensions DO, the sub-objects comprise dimensions DSO selected from the object's dimensions DO, and the means for decomposing the object are such that, according to at least one of the sub-object's dimensions, the sub-objects have no overlay.

Thus, preferably, the specific operations are performed by calculation units chained according to at least one cyclic chaining according to the dimension according to which the sub-objects have no overlay.

Also preferably, the sub-objects have no overlay according to any dimension.

In one embodiment, the platform comprises at least one inter-object communication memory for storing the elementary information and/or results from specific operations performed during the processing of a sub-object and used for the processing of another sub-object.

In one embodiment, the platform comprises means for performing a sequence of specific operations not including a specific operation applying the same data during the object's processing.

In one embodiment, the object comprises dimensions DO, the elementary information is received in the platform according to one of the object's DE dimensions, then according to the other dimensions, the sub-objects comprise dimensions DSO selected from the object's dimensions DO and comprising the DE dimension, and the platform is such that an internal sub-object scrolling loop, included in the processing operation, is performed according to the DE dimension.

In one embodiment, the object comprises dimensions DO, the elementary information is received in the platform according to one of the object's DE dimensions then according to the other dimensions, the sub-objects comprise the object's dimensions DO or dimensions DO-1 selected from the object's dimensions DO, the DE dimension not being included, and the platform is such that an internal sub-object scrolling loop, included in the processing operation is performed according to the DE dimension.

In one embodiment, the means for decomposing the object to be processed are such that the size of sub-objects in each dimension is determined according to the size of the object and/or the speed of elementary information received by the platform, and/or the platform's calculation speed and/or the size and speed of at least one of the platform's memories.

In one embodiment, in the case where at least one part of specific operations applies at least one parameter value, the platform comprises Q calculation units calculating the same specific operation simultaneously, and the platform further comprises means for performing at least one sequence of specific operations comprising at least one specific selection operation, this specific selection operation performing the selection of a parameter value from C parameter values at the same time on the Q calculation units in a manner that is differentiated for each processor, according to at least one elementary information and/or at least one specific operation result and/or at least one parameter value.

In one embodiment, the platform comprises Q calculation units calculating the same specific operation simultaneously, and further comprises means for performing at least one sequence of specific operations comprising at least one specific selection operation, this specific selection operation performing the selection of a data item from data C at the same time on the Q calculation units in a manner that is differentiated for each processor, according to at least one elementary information and/or at least one specific operation result and/or at least one parameter value.

In one embodiment, the platform comprises means for performing a sequence of specific operations comprising at least one specific position operation, and, the object comprising dimensions DO, this specific position operation producing position information according to one of the dimensions DO.

In one embodiment, the platform comprises means for performing a sequence of specific operations comprising at least one specific operation producing a relative position according to at least one elementary information and/or at least one specific operation result and/or at least one parameter value.

In one embodiment, the platform comprises Q calculation units for performing at least one part of specific operations, Q being equal to N or a sub-multiple of N.

In one embodiment, the number of Q calculation units is different from N, and wherein the processing of the sub-object comprises one single internal loop of N/Q iterations.

In one embodiment, the platform is such that the Q calculation units are identical.

In one embodiment, the platform comprises means so that the N results from one single specific operation are calculated by one same calculation unit.

In one embodiment, the platform comprises means, when at least one specific operation applies at least one parameter, to perform this specific operation, and the platform further comprises a calculation unit having access to a memory unit containing a part of the values of parameters, the platform being such that this part is determined according to specific operations performed by this calculation unit.

In one embodiment, the platform comprises means so that, when at least one specific operation applies at least one parameter, this parameter depends on the sub-object in the object to be processed.

In one embodiment, the platform comprises chained calculation units.

In one embodiment, the platform comprises calculation units chained according to one chaining and one dimension.

In one embodiment, the platform comprises calculation units chained according to at least one cyclic chaining.

Furthermore, this chaining can, in one embodiment, comprise at least one queue.

In one embodiment, wherein the sub-object comprises dimensions DSO, the platform comprises calculation units chained according to a cyclic chaining for each of the sub-object's dimensions. The cyclic chaining(s) for each of the sub-object's D1 specific dimensions further comprise(s) at least one queue that is shared or not between the cyclic chaining(s) for the sub-object's D1 specific dimension.

In one embodiment, the platform comprises calculation units chained according to at least one of the sub-object's determined dimensions DD by means of a cyclic chaining CC1. The cyclic chaining further comprises at least one queue; and the platform is such that for each application of a specific instruction, the result of this application in a first calculation unit UC1 is transmitted to a calculation unit UC2 or queue which follows said first calculation unit UC1 according to said chaining.

In one embodiment, the platform comprises at least one memory for storing the results from specific operations used during the sub-processing operation of another sub-object, according to the relative position of said other sub-object in relation to said sub-object.

In a still further embodiment, the platform comprises calculation units chained according to at least one cyclic chaining, and means for assigning the specific operations to the calculation units according to the chaining of calculation units and the sequence In one embodiment, the platform comprises means so that the order and/or type of specific operations can be modified.

In one embodiment, the platform comprises cabled calculation units for performing the specific operations according to at least one predetermined sequence of specific operations.

In one embodiment, the platform comprises at least one calculation unit equipped with a memory unit of limited capacity for storing elementary information and/or specific operation results, this memory containing at least sixteen elementary information and/or specific operation results.

In one embodiment, the platform comprises at least one calculation unit having access to a communication memory unit, containing elementary information and/or specific operation results from other sub-objects.

In one embodiment, the platform is such that the communication memory unit has an access speed less than 0.3*N access/sub-object/specific operation.

In one embodiment, the platform is notably integrated into a mobile phone, and comprises means so that the value of Q is fixed at 1 and so that the value of N is included between 2 and 16.

In one embodiment, the platform comprises at least two identical calculation units performing at least one specific operation simultaneously.

In one embodiment, the platform comprises means so that at least one part of specific operation results are stored in memory at an address in the format "base address+offset" or "base address+modulo offset (size of a buffer memory)", the offset being constant for all the results from one same specific operation.

In one embodiment, the platform comprises means for modifying the base address each time that a sub-object is changed in the processing operation.

In one embodiment, the platform comprises means so that at least one part of specific operation results is stored in memory at an address predetermined for all results from one same operation.

In one embodiment, the platform comprises at least one calculation unit equipped with a memory, and wherein the number of transistors is lower than 10,000 per calculation unit, including the associated memory unit.

In one embodiment, the platform comprises means for receiving on input, preferably directly, specific formatted data calculated from generic formatted data, this generic formatted data comprising first data describing at least one sequence of generic operations, the calculation of specific formatted data being performed accounting for a scrolling mode for elementary information in the platform and specific operations from generic operations, these specific operations forming a sequence of specific operations, and the platform comprising means for performing this sequence of specific operations on an object.

In one embodiment, the platform comprises means for processing an object made up of an image, the elementary information being pixels of this image.

In one embodiment, the platform is part of an image capturing and/or rendering device, the operations applying parameters with values that depend on the sequence of operations and/or on this platform and/or on the object to be processed, these parameter values being linked to the characteristics of the optic and/or the sensor and/or the imager and/or the electronics and/or the software for the image capturing and/or rendering device.

In one embodiment, the platform comprises means for processing an object made up of a digital audio signal, the elementary information being the audio samples for this signal.

In one embodiment, the platform comprises means for processing an object made up of a numerical mesh, the elementary information being spatial and temporal information characterising each point of the meshing.

The invention also relates to an object processed by a processing method conform with the above-described method.

Other characteristics and advantages of the invention will become apparent from the non-restrictive description of some of its embodiments, this description being supported by figures wherein:

FIGS. 1a, 1b, 1c 1d, 1e and 1f, already described, show examples of decomposition of an image into sub-objects, conform with the invention FIG. 2 shows a device using a method conform with the invention, FIG. 3 shows an example of a sequence of generic operations applied to several logical blocks and to one parameter.

Figure 4:
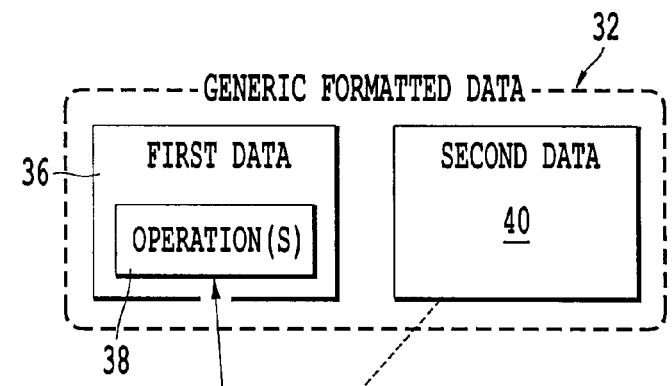
Figure 4:
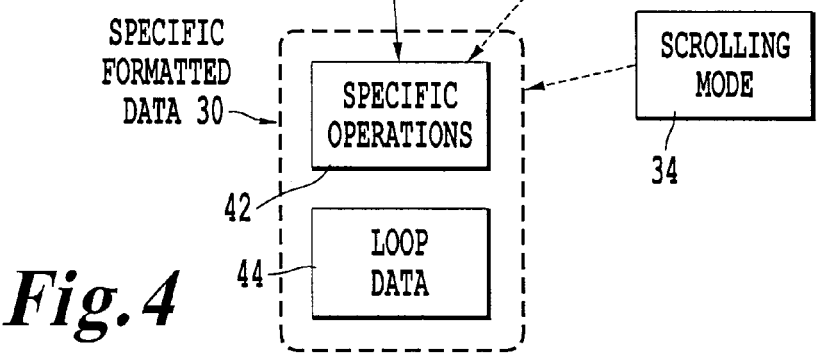
Figure 5:
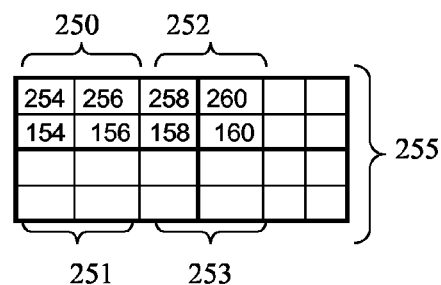
Figure 5:
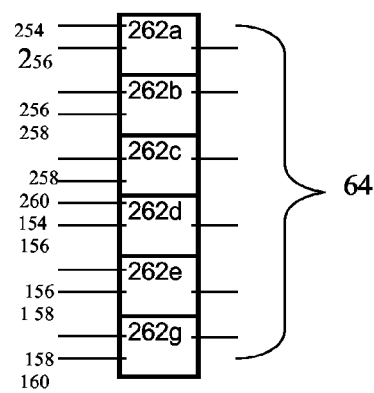
Figure 6:
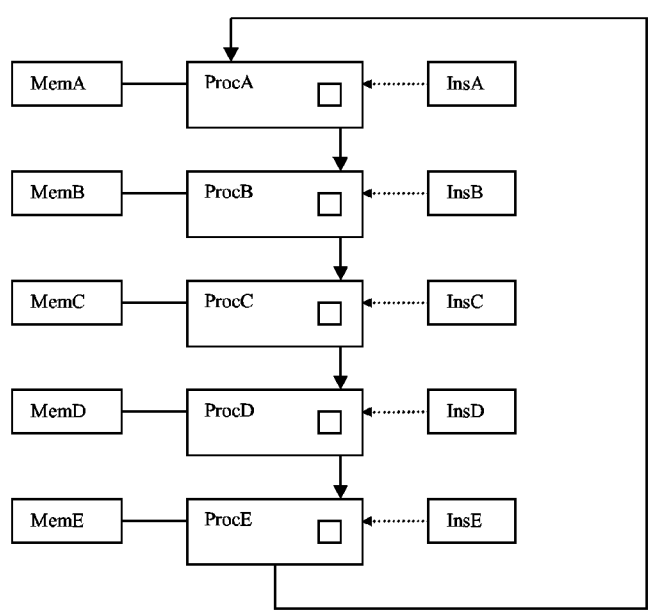
Figure 7:
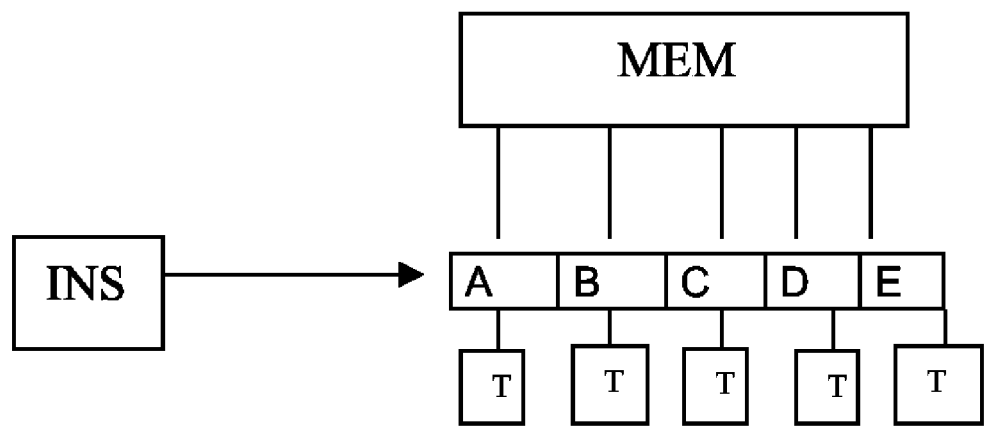
Figure 8:
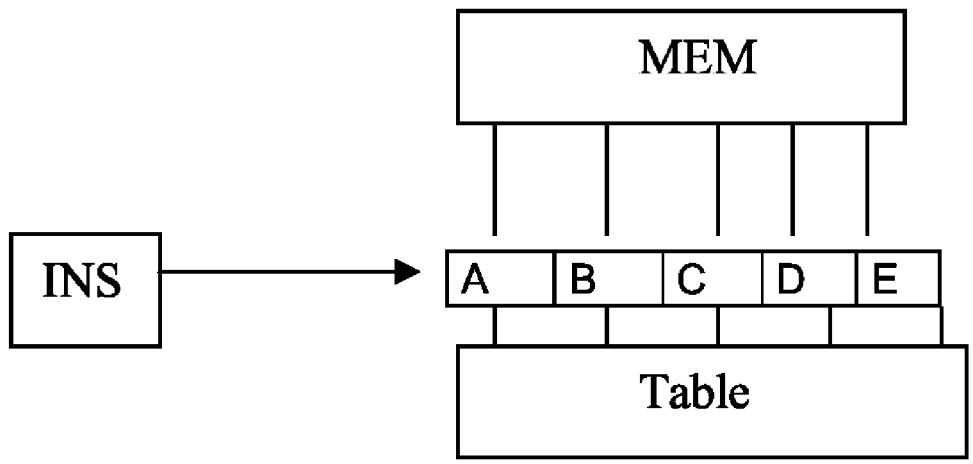

FIG. 4 shows the structure of specific formatted data provided to a platform, in a method conform with the invention, FIG. 5 shows the application of an operation specific to an object, and FIGS. 6, 7 and 8 show different architectures of platforms capable of processing objects according to a method conform with the invention, FIGS. 9a, 9b and 9c show examples of processor chaining in a platform conform with the invention.

The device shown in FIG. 2 is used to process an image 22, this image being a set of pixels represented by at least one numerical value.

In this device, a digital data processing means 10 is provided with generic formatted data 12. This processing means can for example be a compiler.

The generic formatted data, provided by a method conform to the invention, includes first and second data 14 which describe sequences of generic operations and which give the relative positions of the logical blocks involved in these generic operations. This first and second data will be illustrated with FIG. 3.

The processing means 10 also receives on input a scrolling mode 24 for elementary information in the platform determined according to the characteristics of a processing platform 20, such as an image capturing or rendering device.

Using this generic formatted data 12 and these parameters, the processing means 10 provides the processing platform 20 with specific formatted data 18.

The specific formatted data contains different types of data, such as data concerning the organisation of pixels in the platform's memory, the order in which the pixels are processed by the platform or even the grouping of specific operations performed by the platform.

The platform 20 then uses said specific formatted data 18 to process the image 22 that it receives on inbound.

Table 4 below and FIG. 3 show an example of generic formatted data, in the form of a sequence of generic operations applied to a logical block B1. This sequence includes three generic operations. The table's columns show, in order:

The operation's rank in the sequence,
the name of the generic operation,
the logical block (output) on which the result of the generic operation is inscribed, i.e. the location where this result would be, were the object reconstituted at the end of each operation,
the first input (input 1) of the generic operation, which can be a logical block or a parameter,
the relative position of the logical block to be used with relation to the logical block at input 1, if applicable,
the second input (input 2) of the generic operation, which can also be a logical block or a parameter, and
the relative position of the logical block to be used with relation to the logical block at input 2, if applicable, The information located in the "relative position" columns is the information present in the second data provided to a processing means using a method according to the invention.

In one embodiment, the second data refers to the relative position, according to at least one of the object's dimensions, notably spatial and/or temporal, of the blocks and/or parameters in relation to each other, and/or referring to the relative scale, according to at least one of the object's dimensions, notably spatial and/or temporal, of the logical blocks and/or of the parameters in relation to each other.

In this table, this information is found in the form of "left" and "right" for the purpose of simplicity, however in reality, in generic formatted data, it can also be coded by numerical values such as (0;1) and/or by functions such as f(x;y).

In one embodiment, a generic operation generates a logical block made up of the absolute position according to one of the object's dimensions, another generic operation called indirection generates a block by displacement and/or change of scale indicated by a second block from a third block. The calculations of functions giving the relative position and/or the relative scale can then be calculated, for example, 0.5*(x−100) using generic operations on the blocks, then using the generic indirection operation to perform the relative displacement and/or the corresponding relative change of scale.

Table 4 is only an example of coding, the first data and second data can be coded in diverse ways in tabulated format, but also in symbol format, in graph format or in any other format. Furthermore, additional information relative to data types, to offsets and to saturations are not shown in the example for the purpose of simplification.

TABLE IV

| Sequence | Operation | Output | Input 1 | Relative position input 1 block | Input 2 | Relative position input 2 block |
|---|---|---|---|---|---|---|
| 1 | Addition | B2 | B1 | Left | B1 | Right |
| 2 | Table | B3 | Param 1 | | B2 | |
| 3 | Multiplication | B4 | B3 | | B1 | |

The first logical block used in this sequence of operations is a logical block B1 (51). The first generic operation is an addition (52) between the logical block B1 offset to the left (51g), and logical block B1 offset to the right (51d). The result of this addition is recorded in block B2 (53): B2=B1left+B1right.

The second operation (54) is a transformation of block B2 (53) with relation to a table. This operation therefore has block B2 (53) in input and a parameter Param1 (55) which represents the modification table. The result of this operation is recorded in block B3 (56): B3=LUT (Param1, B2).

The third and final operation (57) in this sequence is a multiplication of logical blocks. This operation has logical block B3 (56) and logical block B1 (51): B4=B3*B1 for inputs.

Logical block B4 (58) is thus the block obtained at the end of the sequence of generic operations.

The generic formatted data in the example in table 1 is independent from the platform, from the object's decomposition into sub-objects, from the scrolling mode of the object's elementary information, from the order in which the elementary information will be processed in the platform, as well as from the stored organisation. Indeed, the generic formatted data in table 1 can be translated in diverse manners into specific formatted data or into code for the platform, for example, without the list being restrictive, according to the following translations.

A first example of translation, although not optimal in terms of memory and calculation time, illustrates a simple translation without involving decomposition into sub-objects:

For each of the input object's pixels BP1 (corresponding to logical block B1) excluding the two left-hand and right-hand columns, the pixels being scrolled through from left to right then from top to bottom Add together the pixel on the left of the current pixel and the pixel on the right, store the result in a physical block BP2 (corresponding to logical block B2).

For each pixel of BP2 scrolled through from left to right then from top to bottom apply the table to the current pixel, and store the result in a physical block BP3 (corresponding to logical block B3)

For each pixel of BP3 scrolled through from left to right then from top to bottom Multiply the current pixel by the corresponding pixel of BP1, and store the result in the physical output block BP4 (corresponding to logical block B4).

A second example of translation shows that the size and memory used can be reduced without changing generic formatted data. Indeed, in the first example, 4 physical blocks of a size akin to the image are used. Only 2 physical blocks can be used using the same memory for BP2, BP3 and BP4. The following translation is obtained:

For each of the input object's pixels BP1 (corresponding to logical block B1) excluding the two left-hand and right-hand columns, the pixels being scrolled through from left to right then from top to bottom Add together the pixel on the left of the current pixel and the pixel on the right, store the result in a physical block BP2 (corresponding to logical block B2).

For each pixel of BP2 scrolled through from left to right then from top to bottom apply the table to the current pixel, and store the result in a physical block BP2 (now corresponding to logical block B3)

For each pixel of BP2 scrolled through from left to right then from top to bottom Multiply the current pixel by the corresponding BP1 pixel and store the result in the physical output block BP2 (now corresponding to logical block B4).

A third example of translation shows that the calculation time can be reduced without changing generic formatted data. Indeed, in the second example, 2 physical blocks of size akin to the image are used, but the physical block BP2 is written 3 times in full, the physical block BP1 is read 2 times in full and the physical block BP2 is read 2 times in full. This can be limited to only one reading and one writing, with a different scrolling mode and different blocks. This reduces the number of instructions required, but also reduces memory access requirements. In this case, a sub-object is made up of one pixel. The following translation is obtained:

For each of the input object's pixels BP1 (corresponding to logical block B1) excluding the two left-hand and right-hand columns, the pixels being scrolled through from left to right then from top to bottom Perform the following specific operation sequence: Add together the pixel on the left of the current pixel and the pixel on the right, apply the table to the result and multiply the table output by the current pixel, store the result in the current physical output block BP2 (corresponding to logical block B4)

In a fourth example, more specifically adapted to a scalar processor with cache, the result is written in the same memory zone as the input. This reduces the memory size even further and renders memory access local, which is very beneficial in the case of a cache memory or a paged memory. In this case, a sub-object is made up of one pixel. Thus, the following translation is obtained:

For each of the input object's pixels BP1 (corresponding to logical block B1) excluding the two left-hand and right-hand columns, the pixels being scrolled through from left to right then from top to bottom Perform the following specific operation sequence: Add together the pixel on the left of the current pixel and the pixel on the right, apply the table to the result and multiply the table output by the current pixel, store the result in the current physical output block BP1 in place of the pixel on the left of the current pixel (the left pixel is no longer used contrary to the current pixel which will become the left pixel for the next iteration; BP1 corresponds partially to logical block B4 and partially to logical block B1)

A fifth example of translation is specifically adapted to a signal processing processor with a small quick-access memory and a large slow memory, each sub-object is a rectangle for example 32×32 or any other value maximising the use of the quick-access memory, the rectangles being adjoined. Thus, the following translation is obtained:

For each sub-object, the sub-objects being scrolled from left to right then from top to bottom Launch a transfer via a DMA ("direct memory access") mechanism of the next physical input block from the slow memory to the quick-access memory, corresponding to the next sub-object extended by one column to the left and one to the right, making 32×34

Launch a transfer via a DMA ("direct memory access") mechanism of the previous physical output block from the quick-access memory to the slow memory The physical block, corresponding to the current sub-object extended by an additional column to the left and to the right, is taken on input, making 32×34, and obtained at the end of the DMA of the previous iteration Perform the following specific operation sequence: For each pixel of the physical input block (corresponding to logical block B1) excluding the two columns on the left and right scrolled through from left to right then from top to bottom:

Add together the pixel on the left of the current pixel and the pixel on the right, apply the table to the result and multiply the table output by the block's current pixel, store the result in the current physical output block (corresponding to logical block B4)

A sixth example of translation is specifically adapted to a vector signal processor capable of applying one same calculation to the vector's different pixels, each sub-object is a rectangle, for example 64 horizontal pixels or any other value equal to the size of a vector that the platform is capable of processing and storing. This translation does not require any memory since vectors are processed one at a time. Thus, the following translation is obtained:

For each sub-object V1 of the input object BP1 (corresponding to logical block B1) excluding the two columns on the left, the sub-objects being scrolled through from left to right then from top to bottom, perform the following specific operation sequence:

At the start of each line create a vector V0 containing on the right the line's 2 left-hand pixels Extract form V0 and V1, vector V2 corresponding to the two right-hand pixels of V0 and to the left-hand pixels of V1 excluding the 2 right-hand pixels of V0; add together V1 and V2 to obtain V2, apply the table to each pixel of V2 to obtain V2, Extract from V0 and V1, the vector V3 corresponding to the right-hand pixel of V0 and to the left-hand pixels of V1 excluding the right-hand pixel of V0; copy V0 in V0 for the following iteration; multiply V2 by V3 to obtain V2, store the result V2 in the current physical output block.

The third, fourth, fifth and sixth examples above correspond to embodiments according to the invention for different platforms with different architectures notably in terms of memory and parallelism. With the invention, particularly:

the size of the code can be reduced using only one single loop, and/or the size of the memory can be reduced, to 0 in the example, but in the more general case where there are vertical filters, some memory lines are required to prevent having to repeat calculations for the input data of vertical filters, and/or the number of instructions required can be reduced, notably by grouping the loops, and/or any size of vector can be adapted to, and/or any memory architecture can be adapted to For the purpose of simplification, the examples produce a smaller image than the input image. If necessary, an output image of identical size to the input image can be obtained easily, by adding code at the beginning and end of each line to duplicate the edge pixel.

FIG. 4 shows the structure of specific formatted data at the output of a processing means 10, this data being destined to be provided to a processing platform 20, according to a method conform with the invention.

The specific formatted data is calculated by a processing means using generic formatted data 32 provided to the processing means and using a mode 34 for scrolling elementary information in the platform, determined by this processing means. The generic formatted data includes first data 36 containing data 38 describing at least one generic operation or sequence of operations to be performed by the processing means. The generic formatted data also includes second data 40 referring to the position and relative scale of logical blocks in relation to each other, for generic operations involving at least two logical blocks. Using this generic formatted data and the scrolling mode 34, the processing means provides data 42 relative to the specific operations, and data 44 relative to the loops. This data 42 and 44 is part of the specific formatted data 30.

FIG. 5 shows the application of an operation or an operation specific to an object. In this figure, the object 55 is divided into four sub-objects 250, 251, 252 and 253. Each sub-object being composed of six elementary information. Operation 262 is one of the sequences of operations to be applied to object 255. This operation is applied six times on each sub-object (262a, 262b, 262c, 262d, 262e and 262f) such that six results are produced (264). During its six applications on a sub-object, operation 262 applies elementary information for another sub-object. For example, its application to sub-object 250 takes place as follows: application 262a applies elementary information 254 and 256, application 262b applies elementary information 256 and 258, application 262c applies elementary information 258 and 260, the elementary information 260 belonging to the sub-object 252. Also, application 262d applies elementary information 154 and 156, application 62e applies elementary information 156 and 158, application 62f applies elementary information 158 and 160, the elementary information 160 belonging to the sub-object 252.

Several examples of scrolling modes that can be determined by a method conform with the invention will now be described. Each of these scrolling modes is destined to be used in a platform, the architecture of which is shown in one of FIGS. 5 to 7.

In a first example, illustrated by FIG. 6, the processing platform comprises five processors chained in one dimension, i.e. the result of calculations output from processor Proc A is used in input for processor ProcB, and so forth. The elementary information output from the ProcE processor is applied to the input for processor ProcA.

Each processor is equipped with a memory unit of limited capacity, noted MemA to MemE. This memory unit is destined for storing parameter values that are used for specific operations performed by the processor, or elementary information or results from operations which are destined to be re-used quickly by the processor.

In this first example, the processing operation consists in applying a sequence of eight operations noted OP1 to OP8 to the elementary information composing the object.

In order to processed, the object must be decomposed into sub-objects of N elementary information each. N, which must be a multiple of Q (Q=5, quantity of calculation units), is determined upstream from the platform by a method conform with the invention, notably according to the platform's memory capacities. In the example, N=5.

Furthermore, in order to perform regular sequencing of the specific operations used, specific operations without effect OP9 and OP10 are created by a processing means located upstream from the platform, such that the number of specific operations to be performed on each sub-object be a multiple of the number of available processors.

According to the specific type of operations, each operation is assigned to be performed by a processor. Here, processor A performs OP1 and OP6, processor B performs OP2 and OP7, processor C performs OP3 and OP8, processor D performs OP4 and OP9, and processor E performs OP5 and OP10.

Each processor executes a set of instructions (InsA to InsE) corresponding to the specific operations with which it has been assigned. The parameters stored in the memories with limited capacity also depend on this assignment. For example, if OP1 is a multiplication by 2, the MemA memory will contain the FIG. 2.

Once these assignments have been made, the operations take place according to a sequencing schedule described by table I below:

In this table, the process advance times are noted T1, T2, . . . T14.

TABLE I

|      | IE1        | IE2        | IE3        | IE4        | IE5         |
|------|------------|------------|------------|------------|-------------|
| OP1  | T1 - ProcA | T2 - ProcA | T3 - ProcA | T4 - ProcA | T5 - ProcA  |
| OP2  | T2 - ProcB | T3 - ProcB | T4 - ProcB | T5 - ProcB | T6 - ProcB  |
| OP3  | T3 - ProcC | T4 - ProcC | T5 - ProcC | T6 - ProcC | T7 - ProcC  |
| OP4  | T4 - ProcD | T5 - ProcD | T6 - ProcD | T7 - ProcD | T8 - ProcD  |
| OP5  | T5 - ProcE | T6 - ProcE | T7 - ProcE | T8 - ProcE | T9 - ProcE  |
| OP6  | T6 - ProcA | T7 - ProcA | T8 - ProcA | T9 - ProcA | T10 - ProcA |
| OP7  | T7 - ProcB | T8 - ProcB | T9 - ProcB | T10 - ProcB | T11 - ProcB |
| OP8  | T8 - ProcC | T9 - ProcC | T10 - ProcC | T11 - ProcC | T12 - ProcC |
| OP9  | T9 - ProcD | T10 - ProcD | T11 - ProcD | T12 - ProcD | T13 - ProcD |
| OP10 | T10 - ProcE | T11 - ProcE | T12 - ProcE | T13 - ProcE | T14 - ProcE |

(OP1–OP6: Sub-object; OP7–OP10: Sub-object)

Each line represents one of 10 specific operations OP1 to OP10. Each column represents one of the elementary information IE1 to IE5, each composing the sub-objects to be processed. This IE1 to IE5 notation is formal; it does not necessarily correspond to a spatial or temporal reality. Indeed, certain specific operations generate a displacement of the elementary information. Thus, the information IE1 processed by the specific operation OP2 may not be the result of the specific operation OP1 applied to the information IE1, but the result of this specific operation OP1 applied to the information IE2, for example, if the specific operation OP1 consists in an offset towards the left.

Each box in this table contains the name of the processor which performs the specific operation, as well as the time when this specific operation is performed during the processing operation. Evidently, this table only represents a part of the processing operation. Here, it is assumed that all the results from required specific operations have already been calculated in the processing operation.

Thus, it is shown that at time T1, the ProcA processor performs the operation OP1 on the first information IE1 of the sub-object 1. At this point in time, the other processors are performing other operations that are not shown in this table.

At time T5, it is shown that each processor performs an operation on one of sub-object 1's information.

When a processor has performed a specific operation on all of a sub-object's elementary information, it proceeds to its next assigned operation. Thus, the ProcA processor performs, from T6, the operation OP6.

Once a processor has performed all its assigned specific operations, the following sub-object is processed. Two different sub-objects (sub-object 1 and sub-object 2) are therefore processed at the same time in the platform.

In this table, it is shown clearly that each specific operation is performed N times (here N=5).

This sequencing schedule is obtained by cyclic chaining in one of the processors' dimensions. The elementary information can therefore transit from one calculation unit to the other. For example, the elementary information IE1 goes via all the processors to "undergo" specific operations OP1 to OP5, then returns to the ProcA processor to start a cycle again and "undergo" operations OP6 to OP7. Note that the initial elementary information IE1 will not necessarily be the IE1 information in all the steps.

In a second example, illustrated in FIG. 7, the platform contains five processors linked to a common memory. Such a structure is classic: it corresponds to that of a vector signal processor (of "Single Instruction Multiple Data" or SIMD type). In the example, each processor is linked individually to a small memory capable of containing parameters such as a correlation table T. In this structure, each processor performs all the specific operations. Thus, all the processors receive the same set of instructions INS.

In this second example, the case is considered where one of the operations consists in using a table to modify one or more elementary information. As seen above, each processor has access to its own table, all tables being identical. In one alternative, each memory is shared by a group of processors. In one alternative, the set of processors share the same memory and obtain the same parameter simultaneously; in this case, a correlation table must be applied, carried out by calculation using one or more parameters, for example to calculate a polynome.

This involves a parallel operation: at each of the process' times, all the processors perform the same operation on different elementary information. This process is illustrated by table II below:

In this table, the process advance times are noted T1, T2, . . . T10.

TABLE II

|     | IE1        | IE2        | IE3        | IE4        | IE5        |
|-----|------------|------------|------------|------------|------------|
| OP1 | T1 - ProcA | T1 - ProcB | T1 - ProcC | T1 - ProcD | T1 - ProcE |
| OP2 | T2 - ProcA | T2 - ProcB | T2 - ProcC | T2 - ProcD | T2 - ProcE |
| OP3 | T3 - ProcA | T3 - ProcB | T3 - ProcC | T3 - ProcD | T3 - ProcE |
| OP4 | T4 - ProcA | T4 - ProcB | T4 - ProcC | T4 - ProcD | T4 - ProcE |
| OP5 | T5 - ProcA | T5 - ProcB | T5 - ProcC | T5 - ProcD | T5 - ProcE |
| OP6 | T6 - ProcA | T6 - ProcB | T6 - ProcC | T6 - ProcD | T6 - ProcE |
| OP7 | T7 - ProcA | T7 - ProcB | T8 - ProcC | T7 - ProcD | T7 - ProcE |
| OP8 | T8 - ProcA | T8 - ProcB | T8 - ProcC | T8 - ProcD | T8 - ProcE |

TABLE II-continued

|  | IE1 | IE2 | IE3 | IE4 | IE5 |
|---|---|---|---|---|---|
| OP9 | T9 - ProcA | T9 - ProcB | T9 - ProcC | T9 - ProcD | T9 - ProcE |
| OP10 | T10 - ProcA | T10 - ProcB | T10 - ProcC | T10 - ProcD | T10 - ProcE |

In this table, it can be seen that at a given time T1, the specific operation OPi is performed by each of the processors ProcA to ProcE respectively on the elementary information IE1 to IE5.

After the 10th increment, it can be noted that each specific operation in the sequence of specific operations has been performed on each of a sub-object's elementary information.

In this case, it appears not to be necessary to complete the sequence of specific operations with operations without effect, since the specific operations are performed in parallel by all the processors. In this manner, once the operation OP8 is complete, the process can be repeated by applying operation OP1 to the elementary information constituting the following sub-object.

In a third example, illustrated by FIG. 8, the platform comprises a vector signal processor made up of five processors linked to a common memory, similar to the vector signal processor notably present in a computer of PC type. They are also all linked to a small memory which can contain parameters, and notably a correlation table. In this structure, each processor performs all the specific operations. Thus, all the processors receive the same set of INS instructions comprising data describing all the specific operations to be performed.

In this example, the case where a sequence of two specific operations consists in using a table to modify one or more elementary information is considered. Here, the tables are only present in one single location and the processors must therefore share them.

At the beginning of the process, a parallel operation is being carried out, since all the processors perform one same operation at the same time on the different elementary information of a sub-object. This process is illustrated by the table III below:

In this table, the process advance times are noted T1, T2, . . . T18.

TABLE III

|  | IE1 | IE2 | IE3 | IE4 | IE5 |
|---|---|---|---|---|---|
| OP1 | T1 - ProcA | T1 - ProcB | T1 - ProcC | T1 - ProcD | T1 - ProcE |
| OP2 | T2 - ProcA | T2 - ProcB | T2 - ProcC | T2 - ProcD | T2 - ProcE |
| OP3 | T3 - ProcA | T3 - ProcB | T3 - ProcC | T3 - ProcD | T3 - ProcE |
| OP4 | T4 - ProcA | T5 - ProcB | T6 - ProcC | T7 - ProcD | T8 - ProcE |
| OP5 | T9 - ProcA | T10 - ProcB | T11 - ProcC | T12 - ProcD | T13 - ProcE |
| OP6 | T10 - ProcA | T11 - ProcB | T12 - ProcC | T13 - ProcD | T14 - ProcE |
| OP7 | T11 - ProcA | T12 - ProcB | T13 - ProcC | T14 - ProcD | T15 - ProcE |
| OP8 | T12 - ProcA | T13 - ProcB | T14 - ProcC | T15 - ProcD | T16 - ProcE |
| OP9 | T13 - ProcA | T14 - ProcB | T15 - ProcC | T16 - ProcD | T17 - ProcE |
| OP10 | T14 - ProcA | T15 - ProcB | T16 - ProcC | T17 - ProcD | T18 - ProcE |

In the first three lines of this table, it can be seen that at a given time T1, the specific operation OPi is performed by each of processors ProcA to Proc E respectively on the elementary information IE1 to IE5.

When operation OP4 is reached, which uses a table, an access problem is encountered, since all the processors cannot access this table simultaneously. The processors are therefore obliged to "await their turn", i.e. to wait until the previous processor has finished using the table to be able to use it itself. Thus, the operation OP4 is performed by processors ProcA to ProcE respectively at times T4 to T8. Assuming that the operation OP5 also uses a table, in the same manner the following situation will arise: operation OP5 is performed by processors ProcA to ProcE respectively at times T9 to T13.

Once these operations have been performed, the process can continue as normal.

FIG. 9a shows an embodiment example of a platform, comprising several cyclic chainings according to one of the sub-object's dimensions. In this first example, the object is an image with two dimensions, the sub-object comprises 4 elementary information, and the platform comprises 4 processors disposed according to a grid of 4*1 processors corresponding to a rectangle of 4 processors horizontally and 1 processor vertically. The processors are called up from left to right: P1, P2, P3, and P4. The method also applies 2 queues in this example:

a horizontal queue FHa is connected on input to an output of P4 and on output to an input of processor P1. An output of P1 is connected to an input of P2. An output of P2 is connected to an input of P3, and an output of P3 is connected to an input of P4.

vertical queue FVa is connected on input to an output of P1, P2, P3 and P4 and on output to an input of processor P1, P2, P3 and P4.

The sequence of specific operations can apply an arbitrary quantity of horizontal filters FH while using the 4 processors at 100%. For example, in the case of a specific operation OS2 performing the calculation of a filter consisting of an addition between the result of a specific operation OS1 and the result of the same specific operation OS1 on the left: the result of operation OS1 from processor P4 is placed in queue FHa and will be used by OS2 on P1 during the calculation of a subsequent sub-object; the result of operation OS1 from processor P3 is transferred to processor P4 to be used by OS2 on P4 in combination with the result of OS1 on P4; the result of the operation OS1 from processor P2 is transferred to processor P3 to be used by OS2 on P3 in combination with the result of OS1 on P3; the result of the operation OS1 from processor P1 is transferred to processor P2 to be used by OS2 on P2 in combination with the result of OS1 on P2; the result of the operation OS1 performed by P4 during a calculation of a previous sub-object is output from queue FHa and transferred to processor P1 to be used by OS2 on P1 in combination with the result of OS1 on P1; Another specific operation OS3 for the sequence can apply another horizontal filter, the queue is used to retrieve the data in the correct order.

Mutatis mutandis, the sequence of specific operations can apply an arbitrary quantity of vertical filters FV while using the 4 processors at 100%, Lastly, the sequence of specific operations can apply an arbitrary quantity of filters that are non-separable according to both horizontal and vertical dimensions FVH while using the 4 processors at 100%; for example, a non-separable 3×3 filter applied to 4 results from one specific operation OS4, can prompt FVa twice then FHa six times, to obtain the 8 sets of 4 OS4 results previously calculated to be combined with the set of OS4 results from the current sub-object; for example, these non-separable filters can be used in combination with vertical and/or horizontal filters, the 2 queues allowing data to be retrieved in the correct order.

When 2 filters are applied, the sequence of specific operations is therefore such that at least two specific operations distinct from the sequence each produce at least once during their N applications, a result used for the processing of another sub-object. The result used for the processing of another sub-object transits via the queue(s).

In the same manner, FIG. 9b shows a second example, wherein the object is an image with two dimensions, the sub-object comprises 4 elementary information, and the platform comprises 4 processors disposed according to a grid of 2*2 processors corresponding to a rectangle of 2 processors horizontally and 2 processors vertically. The processors are called up from left to right: P4 and P5 on the top line and P6 and P7 on the bottom line. The method also uses 2 queues, in this example:

a horizontal queue FHb is connected on input to the output of P3 and of P6 and in output to the input of P1 and P4 a vertical queue FVb is connected on input to an output of P4 and P5 and in output to an input of processor P6 and P7.

As in the example in FIG. 9a, the sequence of specific operations can apply an arbitrary quantity of vertical and/or horizontal and/or non-separable filters whilst using all 4 processor at 100%.

In a third example, illustrated in FIG. 9c, the platform comprises a single processor P8, connected to a horizontal queue FHc and to a vertical queue FVc. These two queues can be used by the processor to store results from specific operations destined to be re-used subsequently.

Also in the example in FIG. 9a, the sequence of specific operations can apply an arbitrary quantity of vertical and/or horizontal and/or non-separable filters while using the processor at 100%.

The invention claimed is:

1. A platform for processing an object having at least two dimensions and including a plurality of pieces of elementary information, each piece of elementary information being represented by at least one numerical value, said platform comprising:

at least one queue and N*P processors, according to at least one circular chaining, located according to a grid of N*P processors corresponding to a rectangle of N processors horizontally and P processors vertically, each processor performing a sequence of specific operations on sub-objects of the object that have a number of pieces of elementary information identical to the number of processors, said specific operations including calculation of an arbitrary number of vertical and/or horizontal and/or non-separable filters;

a transferring unit to transfer a result of at least one same specific operation of the sequence of specific operations performed by each of the processors to a processor or queue that follows according to the circular chaining, wherein the queue receives at least one result of said same specific operation performed by one of the processors of the circular chaining located at a first extremity of the grid, and another processor of the circular chaining located at a second extremity of the grid receives at least one result of the same specific operation of said queue performed during application of the sequence of specific operations to a preceding sub-object by said processor of the circular chaining located at the first extremity of the grid.

2. The platform according to claim 1, wherein P is equal to 1.

3. The platform according to claim 1, where the object is an image and a piece of elementary information is a pixel.

4. The platform according to claim 1, wherein the number of queues is the same as the number of dimensions of the sub-objects.

5. A method, implemented on a platform, for processing an object having at least two dimensions and including a plurality of pieces of elementary information by a platform, each piece of elementary information being represented by at least one numerical value, said platform including, according to at least one circular chaining, at least one queue and N*P processors located according to a grid of N*P processors corresponding to a rectangle of N processors horizontally and P processors vertically, said method comprising:

performing, via each processor, a sequence of specific operations on sub-objects of the object that have a number of pieces of elementary information identical to the number of processors, said specific operations including calculation of an arbitrary number of vertical and/or horizontal and/or non-separable filters on at least one piece of elementary information;

transferring a result of at least one same specific operation of the sequence of specific operations performed by each of the processors to a processor or queue that follows according to the circular chaining;

receiving, in said queue, at least one result of said same specific operation performed by one of the processors of the circular chaining located at a first extremity of the grid; and receiving, in another processor of the circular chaining located at a second extremity of the grid, at least one result of said same specific operation of said queue performed before by said processor of the circular chaining located at the first extremity of the grid.

6. The method according to claim 5, wherein P is equal to 1.

7. The method according to claim 5, wherein the object is an image and a piece of elementary information is a pixel.

8. The method according to one of claims 5, wherein the number of queues is the same as the number of dimensions of the sub-objects.

* * * * *